(12) United States Patent
Date et al.

(10) Patent No.: US 7,649,871 B2
(45) Date of Patent: Jan. 19, 2010

(54) COMMUNICATION CONTROL APPARATUS FOR DETERMINING DATA TRANSMISSION TIMING WITH A NODE TYPE AND A STATE VARIABLE

(75) Inventors: Masaaki Date, Osaka (JP); Kosuke Sekiyama, Fukui (JP); Katsuhiro Suzuki, Fukui (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 726 days.

(21) Appl. No.: 11/342,311

(22) Filed: Jan. 30, 2006

(65) Prior Publication Data

US 2006/0171409 A1    Aug. 3, 2006

(30) Foreign Application Priority Data

Jan. 31, 2005    (JP)    ............................. 2005-024175

(51) Int. Cl.
*H04B 7/216*    (2006.01)
(52) U.S. Cl. ...................................... 370/335; 370/347
(58) Field of Classification Search ................ 370/335, 370/349, 350, 437; 375/373; 709/225
See application file for complete search history.

(56) References Cited

U.S. PATENT DOCUMENTS

| | | | | |
|---|---|---|---|---|
| 5,210,753 A | * | 5/1993 | Natarajan | ................... 370/338 |
| 5,592,623 A | * | 1/1997 | Kurobe | ....................... 709/225 |
| 5,726,984 A | * | 3/1998 | Kubler et al. | ................ 370/349 |
| 6,751,231 B2 | * | 6/2004 | Fellman et al. | .............. 370/437 |
| 7,123,600 B2 | * | 10/2006 | Ozluturk et al. | ............. 370/335 |
| 7,460,631 B2 | * | 12/2008 | Date et al. | ................... 375/373 |
| 7,466,685 B2 | * | 12/2008 | Date et al. | ................... 370/350 |

OTHER PUBLICATIONS

Y. Matsushita et al, "Wireless LAN Architecture," Kyoritsu Shuppan Co., Ltd. Tokyo, Japan, 1996, pp. 47, 53-59 and 69.

\* cited by examiner

*Primary Examiner*—Ricky Ngo
*Assistant Examiner*—Phuongchau B Nguyen
(74) *Attorney, Agent, or Firm*—Venable LLP; Michael A. Sartori; Christopher Ma

(57) ABSTRACT

A communication control apparatus, mounted on each node of a telecommunications system, receives node type information selected by a neighboring node, and transmits node type information selected by the own node and node type information of another node. The apparatus receives the state variable signal of the neighboring node reflecting a phase representing another node's data transmission timing, and transmits a state variable signal representing the own node's data transmission timing. Subsequently, the apparatus selects the own node's node type in accordance with another node's type information received. The apparatus then varies, based on the own node's node type information selected, another node's node type information and the neighboring node's state variable signal, the state of the own node's phase in accordance with a time evolution rule based on a phase response function and a synchronization alliance function for thereby determining the own node's data transmission timing.

20 Claims, 13 Drawing Sheets

| $\tau(i)$ | TYPE SELECTED BY OWN NODE i |
|---|---|
| $\tau(O_1^i)$ | TYPE SET SELECTED BY NODE IN 1ST NEIGHBORING RANGE OF NODE i |
| $\tau(O_2^i)$ | TYPE SET SELECTED BY NODE IN 2ND NEIGHBORING RANGE OF NODE i EXCEPT FOR 1ST RANGE |
| $\tau(O_3^i)$ | TYPE SET SELECTED BY NODE IN 3RD NEIGHBORING RANGE OF NODE i EXCEPT FOR 2ND NEIGHBORING RANGE | ic
COMMUNICATION CONTROL APPARATUS FOR DETERMINING DATA TRANSMISSION TIMING WITH A NODE TYPE AND A STATE VARIABLE

BACKGROUND OF THE INVENTION

1. Field of the Invention

The present invention relates to a communication control apparatus for a telecommunications system, and more particularly to a communication control apparatus applicable to a telecommunications system, such as a sensor network, a local area network (LAN), which is formed by a plurality of network node devices spatially distributed or carried on mobile bodies to transmit data therebetween, for obviating a collision between transmitted data ascribable to interference of electromagnetic waves or similar cause.

2. Description of the Prior Art

For allowing a plurality of spatially distributed nodes to transmit and receive data therebetween without any collision, available are a time division multiple access (TDMA) system and a carrier sense multiple access (CSMA) system such as a CSMA/CA (Carrier Sense Multiple Access with Collision Avoidance) system and a CSMA/CD (Carrier Sense Multiple Access with Collision Detection) system, as taught in Y. Matsushita et al., "Wireless LAN Architecture", pp. 47, 53-59 and 69, Kyoritsu Shuppan Co., Ltd., Tokyo, Japan, 1996.

One of the problems with the TDMA system is that, when a central or management node expected to allot time slots fails, the entire telecommunications system goes down. In light of this, there have been proposed various methods of obviating a collision between transmitted data by causing the individual nodes to mutually adjust the allotment of time slots in a distributed coordination or self-organizing fashion without resorting to a central control server. For such mutual adjustment, each node transmits and receives periodic impulse signals to and from its neighboring nodes to interact with them.

More specifically, each node is adapted for using expressions modeling nonlinear oscillation to take account of the timing at which another node transmits an impulse signal to thereby adjust its own timing for the transmission of an impulse signal. With this adjustment scheme, the individual nodes execute mutual adjustment such that the transmission timing of an impulse signal from the own node is apart as far from the transmission timing of an impulse signal from another node as possible, implementing the allotment of time slots in a distributed coordination or autonomous fashion.

Further, when nodes are spatially distributed in a planer lattice or matrix arrangement, there may be implemented an optimum time-division transmission pattern in which only neighboring nodes, lying in a first range, mutually share a time slot, as also proposed in the past. More specifically, the transmission timings of nodes, lying in a third range and held in a particular positional relation free from collisions, are synchronized to each other, so that neighboring nodes, lying in the first range, can mutually share a single period with each other. Consequently, a time slot which each node is acquirable can be maximized. In this sense, the optimum time-division transmission and hence ideal, high-level communication efficiency is achievable.

However, the above-stated communication control system, implementing the optimum time-division communication by the individual nodes, is applicable to a telecommunications system or network in which a plurality of nodes are spatially distributed in a lattice configuration, but not to other types of telecommunications systems or networks not using the lattice configuration.

SUMMARY OF THE INVENTION

It is an object of the present invention to provide a communication control apparatus for a telecommunications system, and a method therefor, capable of implementing the optimum time-division communication and therefore enhancing communication efficiency even in a system in which nodes are not arranged in a lattice pattern.

A communication control apparatus of the present invention is mounted on each of a plurality of nodes constituting a telecommunications system. The communication control apparatus includes a node type information transmitter/receiver for receiving node type information selected by a neighboring node and transmitting node type information selected by the own node and node type information of another node. A state variable signal transmitter/receiver receives the state variable signal of the neighboring node reflecting a phase representative of the timing of data transmission from the neighboring node and transmits a state variable signal representative of the timing of data transmission from the own node. A node type selector selects the node type of the own node in accordance with node type information of the other node received via the node type information transmitter/receiver. A transmission timing calculator varies, based on the node type information of the own node selected by the node type selector and the node type information of the other node as well as the state variable signal of the neighboring node, the state of the phase of the own node in accordance with a time evolution rule based on a phase response function and a synchronization alliance function for thereby determining a data transmission timing of the own node.

A node loaded with the above communication control apparatus, a communication system including a plurality of such nodes and a communication control method applied to each node are also disclosed.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
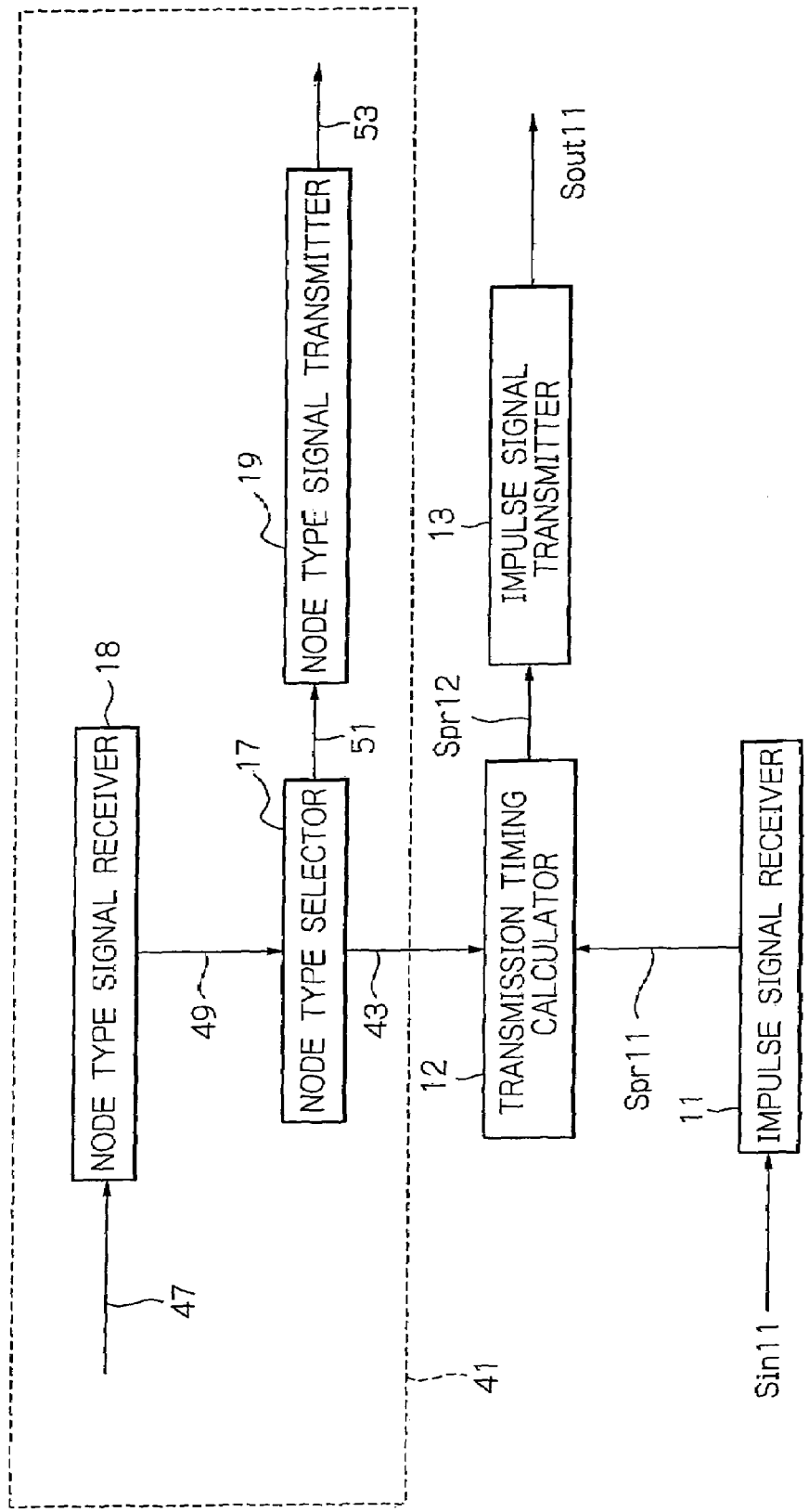
FIG. 1 is a schematic block diagram showing the general construction of a first embodiment of the communication control apparatus in accordance with the present invention.
Figure 2:
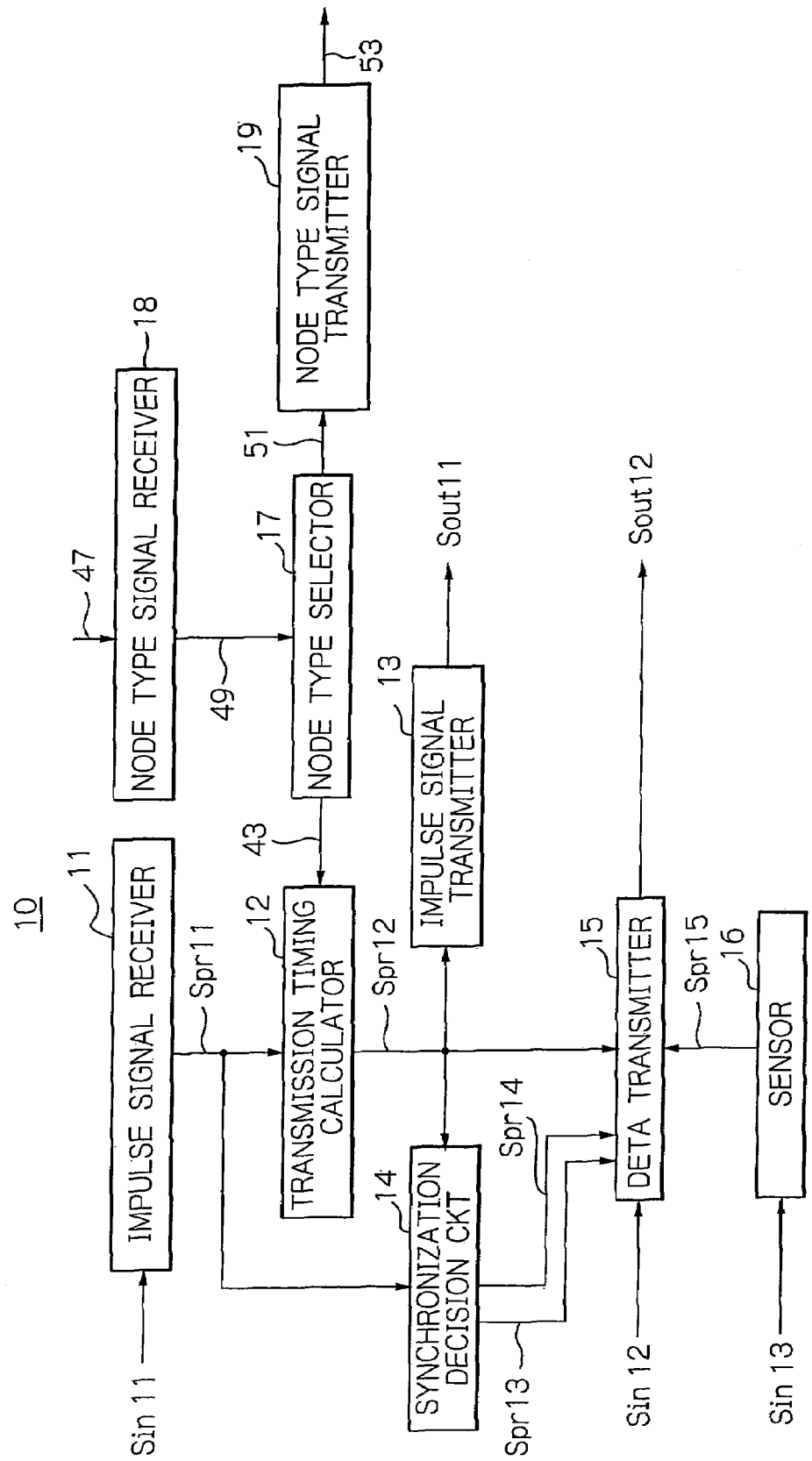
FIG. 2 is a schematic block diagram showing a specific configuration of the node included in the illustrative embodiment shown in FIG. 1.

Referring now to FIGS. 1 and 2 of the drawings, a first embodiment of the communication control apparatus for a telecommunications network system in accordance with the present invention is applied to a sensor network made up of a plurality of nodes by way of example. Specifically, FIG. 1 shows the general construction of the communication control apparatus while FIG. 2 shows a specific configuration of a node included in the illustrative embodiment. Generally, as seen from FIG. 1, the illustrative embodiment is capable of selectively executing two different procedures, i.e. one that executes consecutive steps enclosed by a dotted rectangle 41 as preprocessing and then performs transmission timing calculation after the convergence of node type selection, and the other that executes node type selection and transmission timing calculation in parallel, as will be described specifically later.

As shown in FIG. 2, the node, generally 10, includes an impulse signal receiver 11, a transmission timing calculator 12, an impulse signal transmitter 13, a tuning decision circuit 14, a data transmitter/receiver 15, a sensor 16, a node type selector 17, a node type signal receiver 18 and a node type signal transmitter 19, which are interconnected as illustrated. The impulse signal receiver 11, transmission timing calculator 12, impulse signal transmitter 13, tuning decision circuit 14 and node type selector 17 constitute the communication control apparatus.

The impulse signal receiver 11 is adapted to receive an input impulse signal Sin11, transmitted from a neighboring node, e.g. a node lying in a range over which an electromagnetic wave transmitted from the node 10 can propagate. The impulse signal, transmitted and received as a timing signal, has a Gaussian distribution or similar impulse waveform distribution. The impulse signal may contain destination address, e.g. address information representative of the spatial position of the own node, if desired. The impulse signal receiver 11 is adapted to output a received impulse signal Spr11, resultant from shaping the waveform of the input impulse signal Sin11 or regenerating itself.

The transmission timing calculator 12 is adapted to be responsive to node type information 43 selected by the node type selector 17 and received impulse signal Spr11 to generate a phase signal Spr12, which determines or defines the transmission timing of the node 10, as will be described more specifically later. It should be noted that the transmission timing calculator 12 outputs the phase signal Spr12 even when the received impulse signal Spr11 is absent.

Assuming that the phase signal Spr12 of a node i has a value of $\theta_i(t)$ at a time t, then the transmission timing calculator 12 varies the phase signal Spr12 (=$\theta_i(t)$) in nonlinear oscillation rhythm in response to the received impulse signal Spr11, as will be described later more specifically. The variation of the phase signal realizes a nonlinear characteristic that causes nearby nodes to tend to become opposite in phase (inversion of an oscillation phase) or become different in phase from each other. In other words, in order to prevent, e.g. the transmission timings of output impulse signals Sout11 transmitted from the neighboring nodes from colliding with each other, the illustrative embodiment uses such a nonlinear characteristic for avoiding collisions, i.e. establishes a suitable time relation or time lag.

The functional principle of the transmission timing calculator 12 will be described more specifically with reference to FIGS. 3A through 3C and 4A through 4C. It is to be noted that the function of the impulse signal transmitter 13 also relates to state transitions shown in FIGS. 3A through 4C. Paying attention to a given node, FIGS. 3A through 4C demonstrate a relation between the given node or node of interest i and a neighboring node or nodes j, i.e. how a phase relation between the nonlinear oscillation rhythms of the nodes i and j varies with the elapse of time.

Figure 3A:
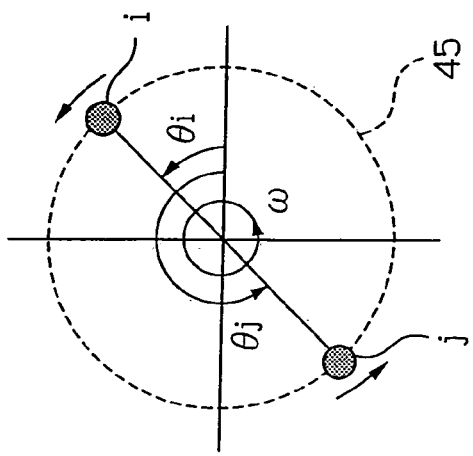
FIGS. 3A, 3B and 3C demonstrate a specific condition in which two nodes are tuned to each other.
Figure 3B:
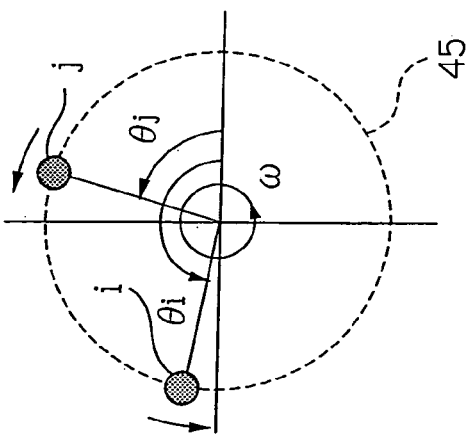
Figure 3C:
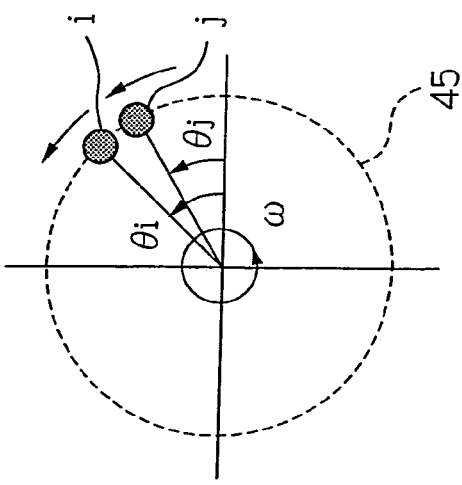

FIGS. 3A, 3B and 3C show a specific case wherein a node of interest or own node i and a single node j adjoining it exist together. In FIGS. 3A, 3B and 3C, two material points, rotating on a circle 45, are respectively representative of the nonlinear oscillation rhythms of the node of interest i and the neighboring node j. The angles $\theta_i$ and $\theta_j$ of the material points i and j, respectively, on the circle 41 are representative of the instantaneous values of phase signals. The circular movements of the material points i and j are projected onto the ordinate or the abscissa to represent the respective nonlinear oscillation rhythms. The two material points i and j tend to become opposite in phase to each other in accordance with the operation based on an expression (5) to be described specifically later. As a result, even if the phases of the two material points i and j are close to each other, as shown in FIG. 3A, the state varies as the time elapses via a transition state shown in FIG. 3B to a stable state shown in FIG. 3C in which the phase difference between the two points i and j is substantially equal to pi, $\pi$.

The two material points i and j each rotate at particular primary angular velocity equal to the respective specific angular oscillation frequency parameter $\omega$. The primary angular velocity corresponds to the basic velocity at which a material point varies its state. When the two nodes become interactive in response to impulse signals transmitted therebetween, the two points i and j vary the respective angular velocities ahead or behind so as to ultimately establish the stable state at which the appropriate relation is maintained. This operation may be considered to indicate that the two points i and j repel each other while rotating to establish the stable phase relation. In the stable state, FIG. 3C, if each of the two nodes i and j is in its predetermined phase, e.g. zero, to transmit the output impulse signal Sout11, then the transmission timings of both nodes establish the adequate timing relation with each other.

Figure 4A:
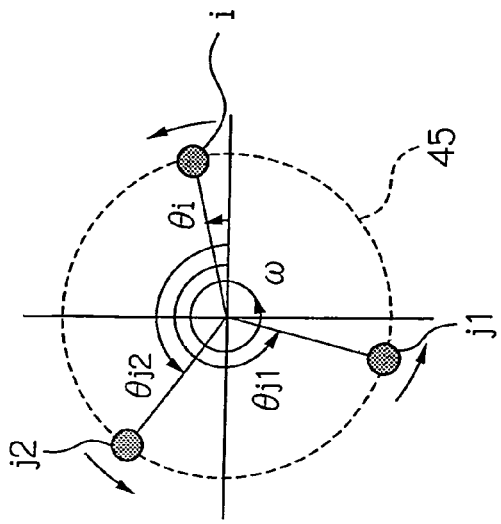
FIGS. 4A, 4B and 4C demonstrate another specific condition in which three nodes are tuned to each other.
Figure 4B:
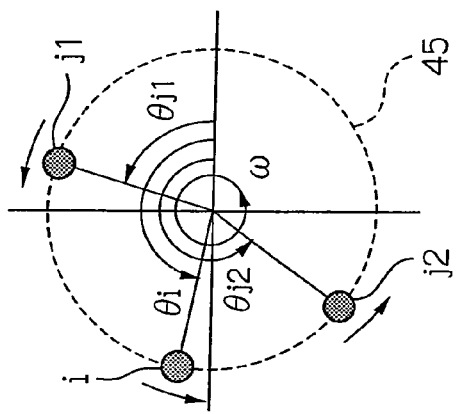
Figure 4C:
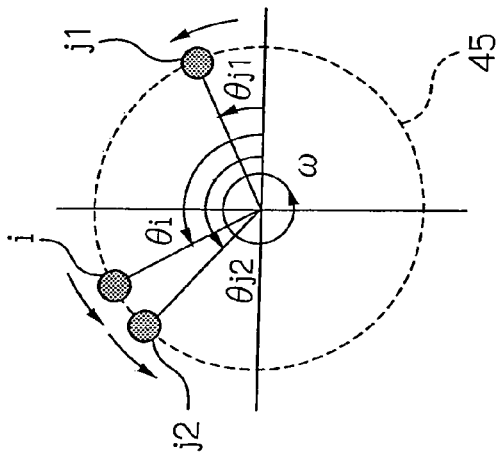

FIGS. 4A, 4B and 4C show another specific case wherein the own node i and two neighboring nodes j1 and j2 exist together. In this case, too, the material points i, j1 and j2 repel each other while, in rotation, establishing the stable phase relation with respect to time. This is also true when three or more nodes neighbor the node of interest i.

The stable phase relation or stable state thus established is, in nature, remarkably adaptive to a change in the number of neighboring nodes, i.e. remarkably flexible. For example, assume that when a single node j1 neighbors the node of interest i in a stable phase relation or stable state, another neighboring node j2 is added. Then, although the stable state is once disturbed, a new stable state is again established between the node of interest i and two neighboring nodes j1 and j2 via a transitional or transient state. This is also true when either one of the neighboring nodes j1 and j2 disappears or fails due to an error or similar cause occurring therein.

In the illustrative embodiment, the transmission timing calculator 12 is adapted for using the expression (5) to be described later specifically to establish a mutual, stable phase relation. The transmission timing calculator 12 delivers the phase signal Spr12 ($=\theta_i(t)$) calculated to the impulse signal transmitter 13, tuning decision circuit 14 and data transmitter/receiver 15.

The impulse signal transmitter 13 is adapted to transmit an output impulse signal Sout11 in response to the phase signal Spr12, i.e. when the phase signal Spr12 reaches a predetermined phase $\alpha$ ($0 \leq \alpha < 2\pi$). The predetermined phase $\alpha$ should preferably be uniform in the entire telecommunications system and will be assumed to be zero hereinafter. In the state shown in FIG. 3C, because the phase signals of the nodes i and j differ in phase from each other by $\pi$ in the stable state, the transmission timings of output impulse signals from the node i and j are shifted from each other by $\pi$ despite that $\alpha$ is uniform in the entire system.

The tuning decision circuit 14 is adapted to determine whether mutual adjustment or tuning executed between the own node and one or more neighboring nodes as to the transmission timing of the output impulse signal Sout11 is in the transition state shown in FIG. 3B or 4B or in the stable state shown in FIG. 3C or 4C. More specifically, the tuning decision circuit 14 monitors the generation timing of the received impulse signal Spr11, which corresponds to the output impulse signal Sout11 of another node, and the generation timing of the output impulse signal Sout11. The decision circuit 14 determines that the mutual adjustment mentioned above is in the stable state if the time lag between the transmission timings of the nodes, which transmit and receive impulse signals with each other, is stable with respect to time. In the illustrative embodiment, in order to allow the tuning decision circuit 14 to grasp the generation timing of the output impulse signal Sout11 to be transmitted from the own node, the circuit 14 is connected to receive the phase signal Spr12 instead of the output impulse signal Sout11.

To make the above decision on tuning, the tuning timing calculator 14 may execute the following specific sequence of steps. The tuning decision circuit 14 monitors, over a single period of the phase signal Spr12, the value $\beta$ of the phase signal Spr12 occurring at the output time at which the received impulse signal Spr11 is output. Assume that the values $\beta$ of the phase signal $\theta_i(t)$ thus monitored are $\beta_1, \beta_2, \ldots, \beta_N$ ($0<\beta_1<\beta_2<\ldots\beta_N<2\pi$). The tuning decision circuit 14 then calculates, based on the monitored values $\beta$, differences between nearby values, i.e. phase differences $\Delta_1=\beta_1, \Delta_2=\beta_2-\beta_1, \ldots, \Delta_N=\beta_N-\beta_{(N-1)}$.

The tuning decision circuit 14 executes the steps stated above every period of the phase signal Spr12 to thereby produce variations or differences, $\gamma_1=\Delta_1(\tau+1)-\Delta_1(\tau), \gamma_2=\Delta_2(\tau+1)-\Delta_2(\tau), \ldots, \gamma_N=\Delta_N(\tau+1)-\Delta_N(\tau)$ between the phases in the consecutive periods where $\tau$ denotes a given phase of the phase signal Spr12 while $\tau+1$ denotes a period immediately following the period of the phase signal Spr12. Thereafter, the tuning decision circuit 14 determines that the tuning is in the stable state when the variations $\gamma$ all are smaller than a small parameter or threshold value $\epsilon$, i.e. when there holds relations of $\gamma_1<\epsilon, \epsilon_2<\epsilon, \ldots, \gamma_N<\epsilon$. Alternatively, the tuning decision circuit 14 may be adapted for determining that the tuning is in the stable state when the relations $\gamma_1<\epsilon, \gamma_2<\epsilon, \ldots, \gamma_N<\epsilon$ are continuously satisfied over a consecutive plurality (M) of periods, in which case the degree of the stable state increases with an increase in the number M of consecutive periods. Further, the tuning decision circuit 14 may be adapted to make a decision on the stable state in response to part of or some kind of received impulse signals Spr11.

The tuning decision circuit 14 feeds, every period of the phase signal Spr12, the data transmitter/receiver 15 with a tuning decision signal Spr13 representative of the result of a decision and a slot signal Spr14, which is the minimum value $\beta_1$ of the value $\beta$ of the phase signal Spr12 appearing at the time when the received impulse signal Spr11 is generated. Why the minimum value $\beta_1$ is output as a slot signal Spr14 is related to the condition of $\alpha=0$, so that the value $\beta$ applied to the slot signal Spr14 varies in accordance with the value $\alpha$ selected.

The node 10 serves as selectively relaying data received from another node or transmitting data originally generated therein. The sensor 16 is provided, as an example of the source of data originating in the node 10, to sense or catch information Sin13 on the intensity of sound or oscillation, the density of a chemical substance, temperature or similar physical or chemical environment to feed the resulting sensed information Spr15 to the data transmitter/receiver 15. As an example of data to be relayed by the node 10, a data signal transmitted from a neighboring node, corresponding to an output data signal Sout12 described later, is input to the data transmitter/receiver 15 of the node 10 as an input data signal Sin12.

The data transmitter/receiver 15 is further adapted to transmit the sensed data Spr15 and/or the input data signal Sin12 to another node in the form of output data signal Sout12. More specifically, the data transmitter/receiver 15 executes such transmission in a time slot, which is different from a conventional, fixed time interval allotted by, e.g. a system, when the tuning decision signal Spr13 is representative of a stable state. The transmitter/receiver 14 does not execute such transmission when the signal Spr13 is representative of a transitional state. The output data signal Sout12 has its transmission frequency which may lie in the same frequency band as the output impulse signal Sout11.

In the illustrative embodiment, the term "time slot" mentioned above refers to a time interval in which the phase $\theta_i(t)$ of the phase signal Spr12 lies in the range of $\delta_1 \leq \theta_i(t) \leq \beta_1-\delta_2$. The start point of the time slot at which the phase signal is assumed to have the above value $\delta_1$ is a time at which the transmission of output impulse signal Sout11 ends. On the other hand, the end point of the time slot at which the phase signal is assumed to have the value $\beta_1-\delta_2$ is a time preceding the timing of the first impulse signal Spr11 in every period of the phase signal Spr12 by some offset $\delta_2$. The values $\delta_1$ and $\delta_2$ are representative of a phase width corresponding to a minute or short period of time for ensuring that impulse and data signals do not exit at the same time regardless of the signals having been sent out from the own node or other nodes.

The values $\delta_1$ and $\delta_2$ are determined by, e.g. experiments in circumstances in which the node 10 is located. For example, in the stable state shown in FIG. 3C, the node i starts transmitting the output impulse signal Sout11 when the phase $\theta_i$ is zero, ends the transmission of the output impulse signal Sout11 before the phase $\theta_i$ reaches $\delta_1$, starts sending out the output data signal Sout12 when the phase $\theta_i$ is equal to $\delta_1$, ends the transmission of the data signal Sout12 when the phase $\theta_i$ reaches a value $\beta_1-\delta_2$ where $\beta_1$ is nearly equal to $\pi$, and then keeps stopping the transmission of the impulse signal Sout11 and data signal Sout12 until the phase $\theta_i$ again becomes zero. Although the other node j operates in the same manner as the node i on the basis of a phase $\theta_j$, the transmitting operations of the two nodes i and j do not coincide with each other because the phases $\theta_i$ and $\theta_j$ are shifted from each other by about $\pi$. This is also true with a case wherein the number of nodes is three or more.

The node type signal receiver 18 and node type signal transmitter 19 will be described in detail hereinafter. The node type signal receiver 18 is adapted to receive a node type signal 47 sent out from another node and feed the input node type signal 49 to the node type selector 17. Each node stores type information contained in the node type signals 47 sent out by broadcast from neighboring nodes and received by the node type signal receiver 18. The node type selector 17, which will be described specifically later, selects the type of the own node in accordance with the type information stored in the node to develop node type information 51.

The node type transmitter 19 is adapted to transmit by broadcast, when having received the type information 51 from the node type selector 17, a node type signal 53 representative of the type information. The node type transmitter 19 may be implemented by the conventional CSMA/CA system. The node type signal mentioned above is a signal representative of type information selected by each node included in the telecommunications system.

Figures 5, 6:
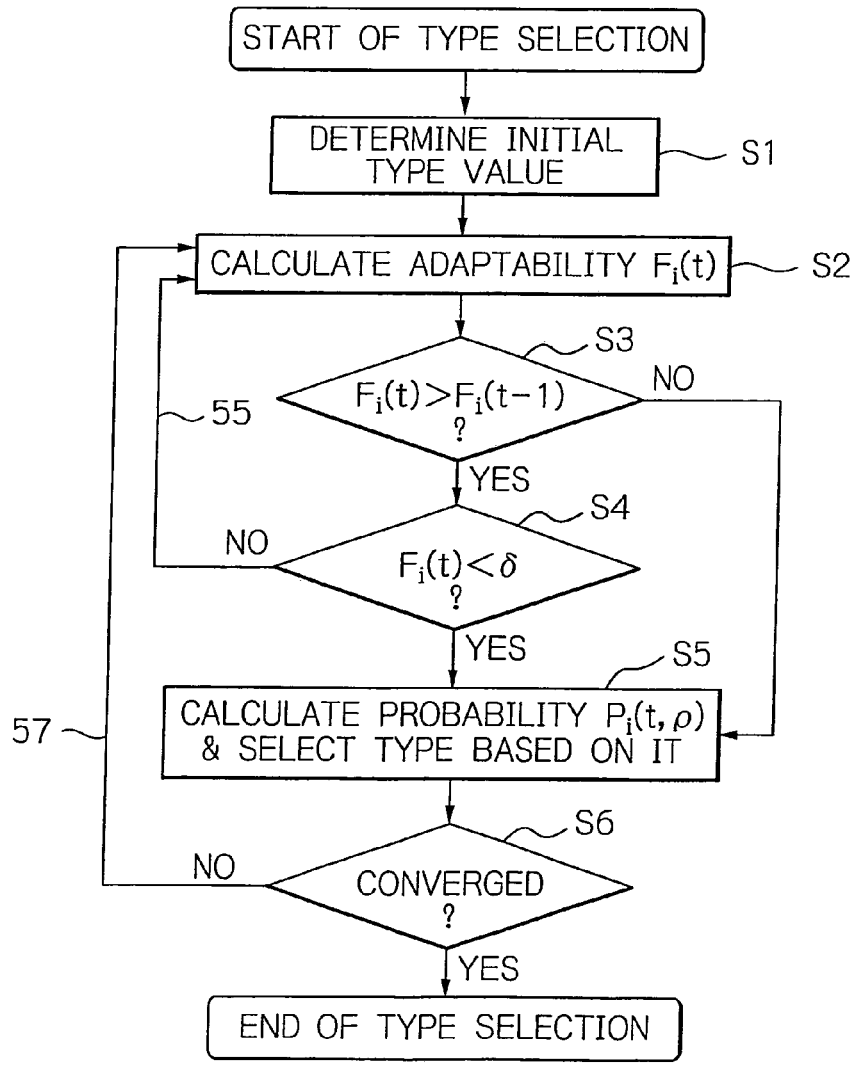
FIG. 5 shows a specific structure of type information included in the illustrative embodiment.
FIG. 6 is a flowchart useful for understanding a specific type selection procedure executed by a node type selector included in the illustrative embodiment.

FIG. 5 shows a specific structure of the node type information 51 included in the node type signal 53 transmitted and received between nodes. Assume that the node type signal 53 is capable of propagating over a distance of r. Then, in FIG. 5, nodes lying in a first range adjacent to a node i refer to nodes present in the range of distance r from the node i, i.e. nodes which the node type signal can directly reach by a single hop. In the illustrative embodiment, the distance r is assumed to be identical in the entire system. Nodes lying in a k-th range (k=1, 2, 3, ...) adjacent to the node i refer to nodes which the node type signal can reach by k hops from the node i, or k hops apart from the node i, by being relayed by other nodes.

Further, in FIG. 5, $O_k$ (k=1, 2, 3, ...) denotes a node set lying in the k-th range except for a (k−1)-th range adjacent to the node i. Also, "i" of $O^i$ denotes a node number; $O^i$ will not be used hereinafter because of limitations on denotation. Moreover, $\tau(*)$ denotes a type or a type set. More specifically, a node i is capable of determining, based on type information received from a neighboring node, the number of hops between the node i and the range in which the neighboring node lies and type information selected by the neighboring node. While the maximum value of k is shown as being "3" in FIG. 5, it is generally open to choice.

Referring again to FIG. 2, the node type signal transmitter 19 transmits, by broadcast, a node type signal 53 including not only type information 51 selected by the node 10 but also type information 49 received from neighboring nodes shown in FIG. 5.

It should be noted that the type information included in the node type signal 53 do not have to include all type information 49 received from neighboring nodes. For example, when type information of neighboring nodes stored in the node i are $\tau(O_1)$, $\tau(O_2)$ and $\tau(O_3)$, FIG. 5, only the node type information $\tau(O_1)$ and $\tau(O_2)$ may be sent out with the type information $\tau(O_3)$ being omitted. In such a case, the node type signal transmitter 19 transmits the node type signal 53 carrying the type information 49 of neighboring nodes two hops apart from the node i together with the type information 51 selected by the node i. It follows that when the node i receives a node type signal 47 from any one of the neighboring nodes a single step apart from the node i, the node i can obtain even the type information of the neighboring nodes three hops apart from the node i. This, however, would not be practicable without transmitting the node type signal in three hops.

The node type selector 17 is adapted to select the type of the own node 10 in accordance with the information 49 of neighboring nodes received and stored by the node type signal receiver 18. Also, the node type selector 17 delivers the type information 51 and 43 of the own node 10 to the node type signal transmitter 19 and transmission timing calculator 12, respectively. The node type selector 17 repeats the selection of the type of the own node every preselected period. Such repeated selection of the type does not have to be synchronized to other nodes, but may generally be executed asynchronously to other nodes.

How the node type selector 17 selects a node type will be described specifically hereinafter. In the following description, the type information of neighboring nodes stored in each node is assumed to be $\tau(O_1), \tau(O_2), \ldots, \tau(O_n)$ while the kinds of node types are represented by 1, 2, ..., Ntyp, where Ntyp is a natural number.

Further, a node set $A_n$ is assumed to be representative of nodes n hops apart from the node i and selecting a type $\sigma$, where $\sigma \in \{1, 2, \ldots, \text{Ntyp}\}$. It is to be noted that the expression $A^i$ is omitted hereinafter because of limitations on denotation. The number of elements included in the node set $A_n$, i.e. the total number of nodes n hops apart from the node i and selecting the type $\sigma$, where $\sigma \in \{1, 2, \ldots, \text{Ntyp}\}$, is assumed to be $|A_n(\sigma)|$; again $A^i$ is omitted because of limitations on denotation. In addition, the total number of nodes n hops apart from the node i is assumed to be $|N_n|$; $N^i$ is omitted for the same reason as $A^i$.

Assume that the node i is selecting a type $\alpha$, i.e. $\tau(i)$ is $\alpha$. Then, the node type selector 17 determines the adaptability $F_i(\sigma)$ of the node on the basis of the total number of nodes $|A_n(\sigma)|$ included in the node set n hops apart from the node i and selecting the same type $\sigma$ as the node i. The adaptability $F_i(\sigma)$ is expressed as:

$$F_i(\sigma) = \exp\left(-\eta \cdot \frac{|A_n^i(\sigma)|}{|N_n^i|}\right) \quad \eta > 0 \tag{1}$$

where the element $|A_n^i(\sigma)|$ denotes a node set n hops apart from the node i and selecting a type $\sigma$ ($\tau \in \{1, 2, \ldots, \text{Ntyp}\}$), $|A_n^i(\sigma)|$ denotes the number of elements constituting a node set $A_n$, i.e. the total number of nodes n hops apart from the node i and selecting the type $\sigma$, $|N_n^i|$ denotes the total number of nodes n hops apart from the node i, and $\eta$ denotes a constant experimentally determined.

The adaptability $F_i(\sigma)$, which lies in the range of $0 < F_i(\sigma) \leq 1$, decreases with an increase in the number of nodes selecting the same type $\sigma$ as the node i, i.e. with an increase in the number of overlapping selections. It increases with a decrease in the number of such nodes. The adaptability $F_i(\sigma)$ is "1" only when no nodes are selecting the same type $\sigma$ as the node i. In this sense, the adaptability $F_i(\sigma)$ is a scale for estimating the degree of selection of the same type by the node i and neighboring nodes, i.e. overlapping selections.

Subsequently, the node type selector 17 determines, based on the adaptability $F_i(\sigma)$ thus determined, the easiness $f_i(\rho)$ of selection of each type ρ, where ρE{1, 2, ..., Ntyp}, by the node i. The easiness $f_i(ρ)$ is produced by:

$$f_i(ρ) = \exp(-ζ \cdot |A_n^i(ρ)|) \quad (2)$$

where $$ζ = a \cdot F_i(σ) + b \quad a > 0, b \geq 0 \quad (3)$$

where a and b are constants experimentally determined.

The easiness $f_i(σ)$ of selection of the type σ is an evaluation scale characterized in that, when the adaptability $F_i(σ)$ is high, types other than one whose $A_n(σ)$ is zero are difficult to be selected while, when the adaptability $F_i(σ)$ is low, even types with relatively small values $A_n(σ)$ other than zero are easily selectable. By providing the easiness $f_i(σ)$ of the selection of a type with the above characteristic, it is possible to prevent the type selection from failing to converge in some nodes.

The node type selector 17 then produces, based on the easiness $f_i(σ)$ of type selection, a probability $P_i(ρ)$ that the node i selects each type p. The probability $P_i(ρ)$ is produced by:

$$P_i(ρ) = \frac{f_i(ρ)}{\sum_{k=1}^{Ntyp} f_i(k)} \quad (4)$$

In the node i, the node type selector 17 calculates the probability of selection $P_i(ρ)$ of each type ρ, where ρE{1, 2, ..., Ntyp}, by use of the expressions (1) through (4) and then selects a type in accordance with the calculated probability $P_i(ρ)$. More specifically, when the node i is selecting a type σ, the node type selector 17 calculates a probability $P_i(ρ)$ based on the easiness of selection $f_i(σ)$ of each type, which is dependent on the adaptability $F_i(σ)$ of the node i, and then executes type selection, i.e. updating of type selection in accordance with the probability $P_i(ρ)$ calculated.

The type selection stated above is repeated at a preselected period and is determined to have converged when, e.g. the adaptability $F_i(σ)$ is greater than c (c being a constant experimentally determined) inclusive and when a particular type is continuously selected over a preselected period of time, e.g. more than N consecutive periods, N being a natural number. In the illustrative embodiment, the values of Ntyp, corresponding to the number of types, are assumed to be the same through all the nodes and are determined by experiments beforehand.

Reference will be made to FIG. 6 for describing a specific procedure in which the node type selector 17 of the node i selects a type with the expressions (1) through (4). As shown, the node type selector 17 sets the initial value of the type of the own node i (step S1). The initial value of the type may be determined at random. Subsequently, when a node type signal from a neighboring node is received by the node type signal receiver 18, type information contained in the node type signal and particular to the neighboring node is stored in the node type signal receiver 18.

The node type selector 17 reads out the stored type information of the neighboring node at a preselected repetition frequency while calculating adaptabilities $F_i(σ)$ with the expression (1) (step S2). In FIG. 6, $F_i[t]$ denotes adaptability $F_i(σ)$ at a time t in the node i; the time t is representative of a discrete time (t=0, 1, 2, ...) whose unit is a period.

The node type selector 17, when determined the adaptability $F_i[t]$ at the time t, compares the adaptability $F_i[t]$ with adaptability $F_i[t-1]$ determined at a time t−1 one period before the time t (step S3). If the adaptability $F_i[t]$ at the time t is greater than the adaptability $F_i[t-1]$ at the time t−1, $F_i[t] > F_i[t-1]$ (Yes, step S3), then the node type selector 17 compares the adaptability $F_i[t]$ with a random number δ lying in the range of 0<δ<1 (step S4).

If the adaptability $F_i[t]$ is smaller than the random number δ, $F_i[t] < δ$ (YES, step S4), then the procedure advances to a step S5. Otherwise (NO, step S4, $F_i[t] \geq δ$), then the node type selector 17 deals with adaptability $F_i[t]$ at a time t+1 without updating the type selection at the time t (step S2), as denoted with a connection 55.

Why a decision on the type selection is made on the basis of the adaptability $F_i[t]$ is that, even when the adaptability $F_i[t]$ has increased to a relatively great value in one period, the probability that type selection will be updated is successfully increased. Again, this prevents type selection from failing to converge in some of the nodes.

On the other hand, if the adaptability $F_i[t]$ at the time t is smaller than the adaptability $F_i[t-1]$ at the time t−1 or is not varied at all, $F_i[t] < F_i[t-1]$, then the node type selector 17 calculates probability $P_i(ρ)$ that a type ρ, where ρE{1, 2, ..., Ntyp}, at the time t will be selected. It is to be noted that $P_i[t,ρ]$ denotes the probability $P_i(ρ)$ of selection of a type ρ at the time t.

The node type selector 17, having thus calculated the probabilities of selection $P_i[t,ρ]$ of the individual types at the time t, selects one of the types, i.e. updates type selection in accordance with the probabilities $P_i[t,ρ]$ (step S5) and then repeats such type selection at a preselected period. Subsequently, the node type selector 17 determines whether or not the type has converged (step S6). When, e.g. the adaptability $F_i(σ)$ is greater than or equal to c, which is a constant determined by experiments, and when a particular type is continuously selected over, e.g. N periods, the node type selector 17 determines that the type has converged (YES, step S6). This is the end of the procedure shown in FIG. 6. If the type has not converged (NO, step S6), then the procedure returns to the step S2 for dealing with types at the time t+1, as depicted with a connection 57.

The type of the own node i, selected by procedure of the node type selector 17 described above, is fed to the node type signal transmitter 19 and transmitted to neighboring nodes thereby.

The transmission timing calculator 12 shown in FIG. 2 will be described in detail hereinafter. As briefly stated above, the transmission timing calculator 12 is responsive to a received impulse signal or timing signal Spr11 and type information 43 selected by the node type selector 17 to perform an arithmetic operation for determining or defining a timing for transmitting an output impulse signal Sout11.

Figure 7:
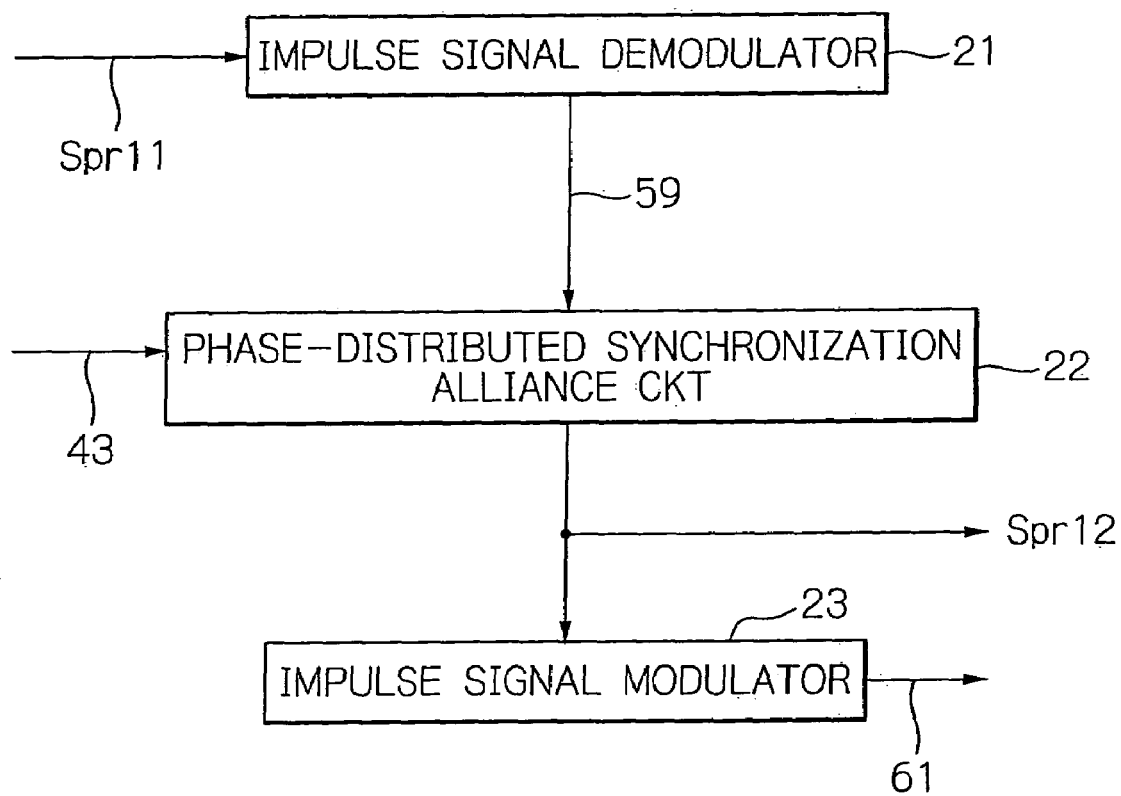
FIG. 7 is a schematic block diagram showing a specific configuration of a transmission timing calculator included in the illustrative embodiment.

More specifically, as shown in FIG. 7 in a schematic block diagram, the transmission timing calculator 12 includes an impulse signal demodulator 21, a phase diffusion synchronization alliance circuit 22 and an impulse signal modulator 23, which are interconnected as illustrated. The impulse signal demodulator 21 is adapted to demodulate the impulse signal Spr11 received from another node in order to derive from it information representative of the spatial position of the other node and a timing signal 59 particular to the latter node.

The own node's type information 43 and the other node's timing signal 59 output from the node type selector 17 and impulse signal demodulator 21, respectively, are input to the phase diffusion synchronization alliance circuit 22, which includes a synchronization alliance circuit to be described later. The phase diffusion synchronization alliance circuit 22 is adapted to be responsive to the signals 43 and 59 to perform phase calculation for determining or establishing the own node's transmission timing and then feed the resulting own node's phase signal Spr12 to the impulse signal transmitter 13, synchronization decision circuit 14 and data transmitter 15, FIG. 2, as well as to the impulse signal modulator 23.

The impulse signal modulator 23 serves to generate the own node's timing signal in response to the phase signal Spr12 output from the phase diffusion synchronization alliance circuit 22 and then modulate the timing signal for thereby producing a modulated impulse signal 61. The modulator 23 is, when generating the timing signal, operative in response to the impulse signal transmitter 13, FIG. 2. In the illustrative embodiment, the impulse signal transmitter 13 merely functions as transmitting the modulated impulse signal 61 output from the transmission timing calculator 12 to other nodes.

Figure 8:
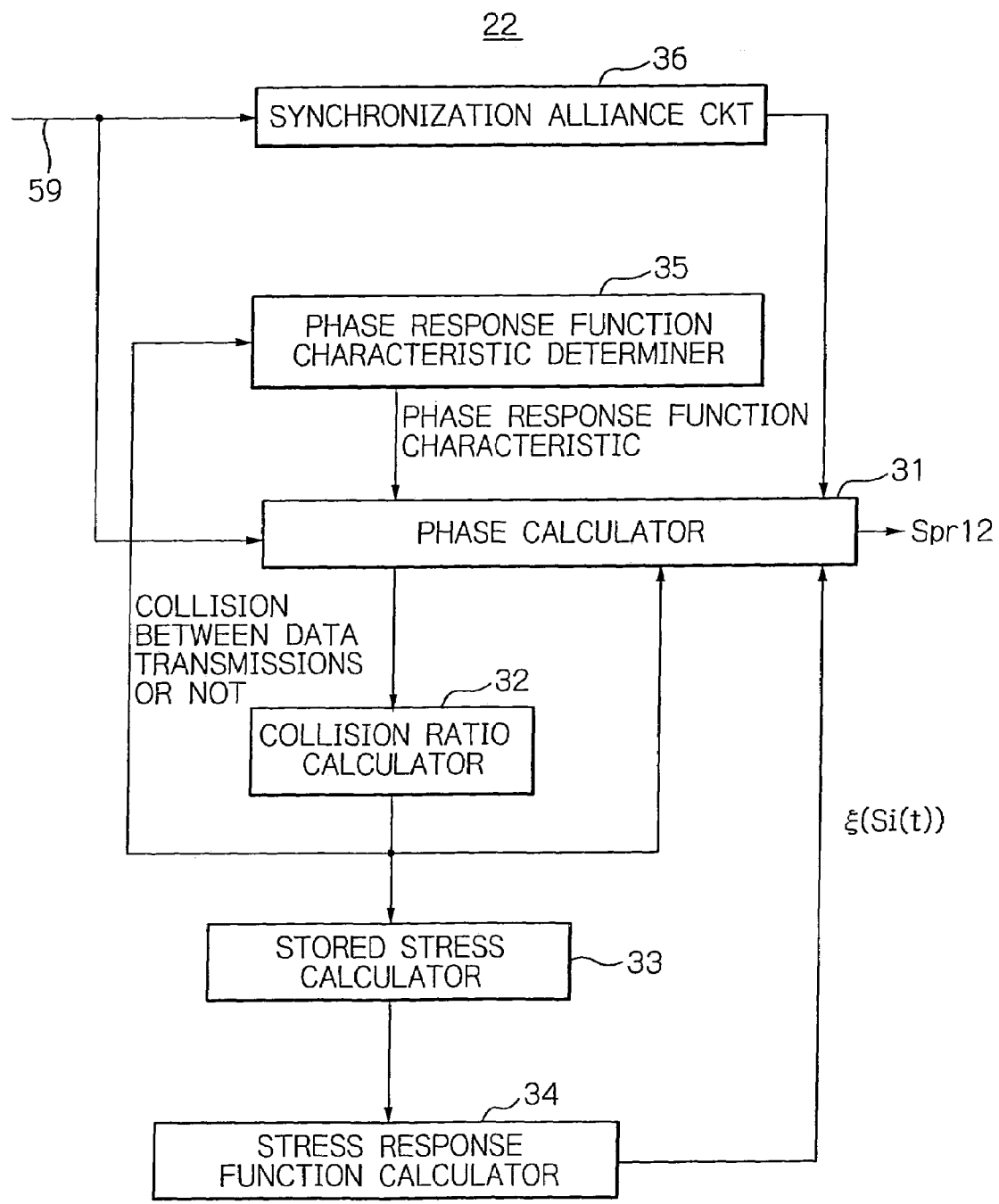
FIG. 8 is a schematic block diagram showing a specific configuration of a phase synchronization alliance circuit included in the illustrative embodiment.

FIG. 8 is a block diagram schematically showing a specific configuration of the phase diffusion synchronization alliance circuit 22. As shown, the phase diffusion synchronization alliance circuit 22 includes a phase calculator 31, a collision ratio calculator 32, a stored stress calculator 33, a stress response function calculator 34, a phase response function characteristic determiner 35 and a synchronization alliance circuit 36, which are interconnected as illustrated.

As briefly stated earlier, the transmission timing calculator 12 performs an arithmetic operation for determining the transmission timing of the output impulse signal Sout11,. To determine the above timing, the transmission timing calculator 12 uses, e.g. the following expression modeling nonlinear oscillation:

$$\frac{d\theta_i(t)}{dt} = \omega_i + \sum_{j \in e_i} P_j(t) \cdot R(\Delta\theta_{ij}(t)) + \sum_{j \in Y_i} P_j(t) \cdot H(\Delta\theta_{ij}(t)) + \xi(S_i(t)) \quad (5)$$

$$\Delta\theta_{ij}(t) = \theta_j(t) - \theta_i(t) = -\theta_i(t) \quad (6)$$

The above expression (5) is representative of a rule for varying, in the time domain, the rhythm of nonlinear oscillation of the node i or own node in response to the input of the received impulse signal Spr11, which is derived from an output impulse signal Sout11 sent out from another node lying in the range of interaction.

Each node j may add the type information of the own node τ(j), or 43, resultantly output from the node type selector 17 to the impulse signal Sout11 to transmit. In such a case, the expressions (5) and (6) define a rule for varying, in the time domain, the phase state of the own node on the basis of a timing signal representative of the phase information of the other node, and the type information of the other node and the own node. The own node transmits an impulse signal Sout11 via the impulse signal transmitter 13, FIG. 2, in a particular phase or timing based on a phase state calculated by the expressions (5) and (6).

The meanings of symbols included in the expressions (5) and (6) and the details of the processing will be described hereinafter. In the expression (5), the variable t is representative of a period of time continuous, but differs in meaning from the symbol t described as being representative of a discrete period of time or period in relation to the node type selector 17 previously. The function $\theta_i(t)$ is representative of a phase on the own node's nonlinear oscillation at the time t.

The function $\theta_i(t)$ is assumed to be constantly confined in the range of $0 \leq \theta_i(t) < 2\pi$ by the operation of mod$2\pi$, i.e. a residual resulting from division by $2\pi$.

Further, in the expression (5), $\Delta\theta_{ij}(t)$ is representative of a phase difference produced by subtracting the phase $\theta_i(t)$ of the own node i from the phase $\theta_j(t)$ of the other node, as indicated by the expression (6). Assuming that each node transmits an output impulse signal Sout11 when the phase $\theta_j(t)$ is zero, then the own node i is allowed to monitor the phase difference $\Delta\theta_{ij}(t)$ only at the time when the output impulse signal Sout11 is received from the other node j, i.e. only one time for a single period. At this instant, while the phase difference $\theta_{ij}(t)$ is equal to $-\theta_i(t)$, as also indicated by the expression (6), it is assumed to be confined in the range of $0 \leq \Delta\theta_{ij}(t) < 2\pi$ by executing mod$2\pi$ after the addition of $2\pi$ for convenience. The above assumption that each node transmits the output impulse signal Sout11 when the phase $\theta_j(t)$ is zero does not effect generality at all.

In the expression (5), $\omega_i$ denotes a specific angular frequency parameter representative of the basic rhythm of each node and assumed to be identical in the entire system by way of example. The function $P_j(t)$ is representative of a signal derived from the output impulse signal Sout11 sent from the other node j, i.e. a received impulse signal.

In each node i, the impulse signal transmitter 13 adds the own node's type information τ(i) output from the node type selector 17 to an impulse signal Sout11 to be transmitted. The function $P_j(t)$ is representative of a timing signal left after the type information τ(j) has been separated from the received impulse signal 47. More specifically, the impulse signal receiver 11 separates the impulse signal 47 received from another node j into the timing signal function $P_j(t)$ and type information τ(j).

Assume that the type information of neighboring nodes to be dealt with by the node type selector 17 of the own node i are τ(O1), τ(O2), ..., τ(On). Then, the impulse signal transmitter 13 transmits the impulse signal Sout11 to a node range m hops (m being a natural number) apart from the own node i and broader than the node range n hops (n being a natural number smaller than m) apart from the own node i. For example, each node transmits an impulse signal Sout11 to a node range (n+1) hops apart from the node. Although various methods are available for the transmission of an impulse signal Sout11 to nodes m hops away from the own node, it is also possible to relay the impulse signal Sout11 by other nodes with a certain method. Alternatively, it is also possible to transmit the impulse signal on an electromagnetic wave having its strength great enough to directly reach the nodes m hops apart from the own node, in which case relaying is not necessary.

The function $R(\Delta\theta_{ij}(t))$ is a phase response function representative of a response characteristic that varies the basic rhythm of the own node in response to the input of the received impulse signal Spr11. The function $R(\Delta\theta_{ij}(t))$ has its characteristic nonlinearly varying the own node's phase $\theta_i(t)$ in a direction repulsing the other node's phase. In the expression (5), $X_i$ is representative of a node set lying in the interaction range of the own node other than elements that belong to a set $Y_i$, which will be described later. Consequently, the term including the function $R(\Delta\theta_{ij}(t))$ has a dynamic characteristic causing the own node's phase to repulse the other node's phase only if the received impulse signal Spr11 is sent out from another node lying in the interaction range to be repulsed, i.e. a node lying in the interaction range other than particular another other node to be described later.

To determine whether or not the impulse signal is sent out from a node to be repulsed, the type information of the own node is compared with that of the other node. If the other node's type is different from the own node's type, then it is determined that the impulse signal is sent out from a node to be repulsed, i.e. belonging to the node set $X_i$.

The synchronization alliance function $H(\Delta\theta_{ij}(t))$, like the phase response function $R(\Delta\theta_{ij}(t))$, is representative of a response characteristic causing the basic rhythm of the own node to vary in response to the input of a received impulse signal, but differs from the function $R(\Delta\theta_{ij}(t))$ in response characteristic. More specifically, the synchronization alliance function $H(\Delta\theta_{ij}(t))$ has a nonlinear characteristic that synchronizes, i.e. causes particular another node lying in a node range m hops apart from the own node and the own node to coincide in phase. In the expression (5), $Y_i$ is representative of a node set lying in the interaction range of the own node and expected to be synchronized. Consequently, the term including the function $H(\Delta\theta_{ij}(t))$ has a dynamic characteristic that synchronizes the own node's phase only if the received impulse signal is sent out from another node lying in the interaction range and expected to be synchronized.

To determine whether or not the impulse signal is sent out from a node to be synchronized, the type information of the own node is compared with that of the other node. If the other node's type is identical with the own node's type, it is then determined that the impulse signal is sent out from a node to be synchronized, i.e. belonging to the node set $Y_i$.

The dynamic characteristic of the function $H(\Delta\theta_{ij}(t))$ stated above may be implemented by, but not limited to, the following function form:

$$H(\Delta\theta_{ij}(t)) = \begin{cases} \Delta\theta_{ij}(t) & 0 \le \Delta\theta_{ij}(t) < \pi \quad (7\text{-}1) \\ \Delta\theta_{ij}(t) - 2\pi & \pi \le \Delta\theta_{ij}(t) < 2\pi \quad (7\text{-}2) \end{cases}$$

A stress response function $\xi(S_i(t))$ causes, when a relative phase difference is small between the own node and the other node, stress to be stored and causes a phase shift or phase state variation of random size to be executed in accordance with a stored stress value $S_i(t)$. The relative phase difference mentioned above may be defined as: assuming a phase difference of $\Delta\theta_{ij}$ and a relative phase difference of E, then if $\Delta\theta_{ij} \le \pi$, $E = \Delta\theta_{ij}$ \hfill (8)

if $\Delta\theta_{ij} > \pi$, $E = 2\pi - \Delta\theta_{ij}$ \hfill (9)

It will be seen from the above that the stress response function $\xi(S_i(t))$ is representative of a response characteristic to the stored stress value $S_i(t)$.

Examples of the phase response function $R(\Delta\theta_{ij}(t))$ and stress response function $\xi(S_i(t))$ will be described hereinafter. To begin with, there will be described a collision between data transmissions, a collision ratio using the duration of a collision as a reference and a collision ratio using the number of times of collisions as a reference, which are terms relating to the above two functions $R(\Delta\theta_{ij}(t))$ and $\xi(S_i(t))$.

First, as for a collision between data transmissions, assume that the minimum time slot necessary for each node to transmit data is $W_{min}$ and that a phase width corresponding to the time slot $W_{min}$ is $\phi c$ and can be produced as a product of $W_{min}$ and specific frequency parameter $\omega_i$, i.e. $\phi c = W_{min} \cdot \omega_i$. The size $W_{min}$ of the time slot is a constant parameter dependent on, e.g. the application of the system.

Further, assume that when a phase difference between a given node and a neighboring node lying in a spatial distance range capable of receiving an impulse signal is smaller than the phase width $\phi c$, it is determined that a collision has occurred between data transmissions. More specifically, when the phase difference of even one of a plurality of received impulse signals Spr11 is smaller than the phase width $\phi c$, it is determined that a collision has occurred between data transmissions.

As for a collision ratio using the duration of a collision as a reference, a function $x_i(t)$ representative of whether or not a collision between data transmissions has occurred at a time t, as determined at each node, is produced by:

$$x_i(t) = \begin{cases} 1 & \text{collision} \\ 0 & \text{else} \end{cases} \quad (10)$$

As shown, the function $x_i(t)$ has a numerical value "1" if a collision is happening at the time t, i.e. collision, expression (10)), or otherwise has a numerical value "0", i.e. else, expression (10). Then, a cumulative duration of collisions $y_i(t)$ in n periods is produced by accumulating, or time-integrating, the values $x_i(t)$ over n periods:

$$y_i(t) = \int_{-n \cdot T_i}^{t} x_i(\tau) d\tau \quad (11)$$

where $T_i$ denotes the period of a node i. The cumulative duration of collisions $y_i(t)$ is representative of the sum of periods of time during which the function $x_i(t)$ takes a value of unity "1" in n periods and can be produced by monitoring the value of the function $x_i(t)$.

A value $c_i(t)$, produced by normalizing the cumulative collision duration $y_i(t)$ by the maximum cumulative collision duration, is representative of the time ratio of collisions occurred in n periods and is referred to as a collision ratio in the illustrative embodiment. The maximum cumulative collision duration is the maximum value of the cumulative collision duration $y_i(T)$. Assuming that each node uses a time slot of a size $W_{min}$ ($=\phi c/\omega_i$) for transmission, then the maximum cumulative collision duration is $n \cdot W_{min}$ ($=n \cdot \phi c/\omega_i$). Therefore, the collision ratio $c_i(t)$ is expressed as:

$$c_i(t) = \frac{\omega_i \cdot y_i(t)}{n \cdot \phi_c} \quad (12)$$

It should be noted that because the phase of each node varies in accordance with the expression (5), the period $T_i$ may take a different value period by period. Therefore, it is likely that the cumulative collision duration $y_i(t)$ exceeds the maximum cumulative collision duration $n \cdot W_{min}$, i.e. the collision ratio $c_i(t)$ exceeds "1". In the illustrative embodiment, collision ratios $c_i(t)$ exceeding "1" are dealt with as "1".

The definition of a collision ratio stated above does not give consideration to whether or not a plurality of collisions have occurred at the same time. The invention is not restricted thereto but a decision may, of course, be made on a plurality of simultaneous collisions.

For defining a collision ratio, use may also be made of, for example, the number of times of simultaneous collisions with the illustrative embodiment, as will be described later. In addition, the collision ratio may be defined with reference to collision time as described above, and alternatively to the number of collisions.

First, whether or not a collision has occurred is determined every period. In this case, even when a collision has occurred a plurality of times during a single period, a count is "1", i.e. only whether or not a collision has occurred is the matter to be considered.

Subsequently, the number of times of collisions occurred during n periods, i.e. a cumulative number, or count, of collisions γ is determined. Thereafter, the cumulative number of collisions γ is normalized by the maximum cumulative number of collisions, i.e. the maximum number of times of collisions that may occur during n periods, thereby producing a collision ratio:

$$c_i(t) = \gamma/n \qquad (13)$$

While the collision ratio produced by the expression (13) may exceed "1" as when the expression (12) is used, such a collision ratio is also dealt with as "1". While the above definition does not give consideration to whether or not a collision has occurred a plurality of times in a single period, a decision may, of course, be made on a plurality of collisions that may occur in a single period.

Let the duration of a collision and the number of times of collisions included in the two different definitions stated above be collectively referred to as a collision amount. Then, to determine a collision amount, a cumulative collision amount during n periods is monitored and normalized by the maximum cumulative collision amount to thereby produce a collision ratio. The collision ratio calculator 32 calculates the collision ratio $c_i(t)$ expressed by the expression (12) or (13).

An example of the phase response function $R(\Delta\theta_{ij}(t))$ which the phase calculator 31 produces and the significance thereof will be described hereinafter. The phase response function $R(\Delta\theta_{ij}(t))$ may be implemented by, but not limited to, the following function form:

$$R(\Delta\theta_{ij}(t)) = \begin{cases} \alpha \cdot (\Delta\theta_{ij}(t) - \phi_d) & \Delta\theta_{ij}(t) \leq \phi_d & (14\text{-}1) \\ 0 & \phi_d < \Delta\theta_{ij}(t) < 2\pi - \phi_d & (14\text{-}2) \\ \alpha \cdot (\Delta\theta_{ij}(t) + \phi_d - 2\pi) & \Delta\theta_{ij}(t) \geq 2\pi - \phi_d & (14\text{-}3) \end{cases}$$

where $\phi_d$ and α denote constant parameters whose values are determined by experiments. The constant parameter $\phi_d$ has its value greater than the minimum phase width $\phi_c$ inclusive necessary for data transmission, i.e. $\phi_d \geq \phi_c$.

The phase response function $R(\Delta\theta_{ij}(t))$ has a nonlinear characteristic causing the phase $\theta_i(t)$ of the own node i to vary in a direction in which a repulsive force acts on the phase of the neighboring node j. More specifically, the repulsive force acts when the relative phase difference $\Delta\theta_{ij}(t)$ between the own node i and the neighboring node j is $\phi_d$. The phase response function $R(\Delta\theta_{ij}(t))$ therefore obtains a dynamic characteristic that makes the relative phase difference $\Delta\theta_{ij}(t)$ mentioned above greater than the minimum phase width $\phi_c$ necessary for avoiding a collision.

The phase response function $R(\Delta\theta_{ij}(t))$ may alternatively be produced by the following function form:

$$R(\Delta\theta_{ij}(t)) = \begin{cases} \alpha \cdot \left(\Delta\theta_{ij}(t) - \frac{2\pi}{p}\right) & \Delta\theta_{ij}(t) \leq \frac{2\pi}{p} & (15\text{-}1) \\ \beta(c_i(t)) \cdot \Delta\tilde{\theta}_{ij}(t) & \frac{2\pi}{p} < \Delta\theta_{ij}(t) < 2\pi - p \text{ and } \Delta\tilde{\theta}_{ij}(t) < \frac{\pi}{p} & (15\text{-}2) \\ \beta(c_i(t)) \cdot \left(\Delta\tilde{\theta}_{ij}(t) - \frac{2\pi}{p}\right) & \frac{2\pi}{p} < \Delta\theta_{ij}(t) < 2\pi - p \text{ and } \Delta\tilde{\theta}_{ij}(t) > \frac{\pi}{p} & (15\text{-}3) \\ \alpha \cdot \left(\Delta\theta_{ij}(t) - \frac{(p-1)\pi}{p}\right) & 2\pi - \frac{2\pi}{p} \leq \Delta\theta_{ij}(t) & (15\text{-}4) \end{cases}$$

where $$\beta(c_i(t)) = b \cdot (1 - c_i(t))^2 \qquad (16)$$

where $\Delta\tilde{\theta}_{ij}(t)$ denotes $$\Delta\theta_{ij}(t)\left(\text{mod}\frac{2\pi}{p}\right),$$

i.e. a residue resultant from dividing $\Delta\theta_{ij}(t)$ by $$\frac{2\pi}{p}.$$

The phase response function $R(\Delta\theta_{ij}(t))$ represented by the expressions (15-1) through (15-4) and (16) allows a uniform phase difference to be set up between neighboring nodes. In the above expressions, p denotes a constant parameter for determining the uniform phase difference. As for the phase response function with such a form, by equalizing the constant parameter p and the number of types Ntyp, it is possible for each node to form substantially the same phase difference pattern between it and Ntyp different kinds of neighboring nodes; the phase difference pattern divides a single period into substantially Ntyp.

Hereinafter will be described a specific example of the stress response function $\xi(S_i(t))$ produced by the sequential operations of the stored stress calculator 33 and stress response function calculator 34 and the significance of the stress response function. The stress response function $\xi(S_i(t))$ may be expressed as:

$$q(S_i(t)) = \begin{cases} \mu & \text{with prob } S_i(t) & (18\text{-}1) \\ 0 & \text{with prob } 1 - S_i(t) & (18\text{-}2) \end{cases}$$

$$S_i(t) = \int_{ts}^{t} s(c_i(\tau))d\tau \qquad (19)$$

In the above expression (19), the function $s(c_i(t))$ is representative of a stress value relating to the collision ratio $c_i(t)$ at the time t and may be configured such that the higher the collision ratio $c_i(t)$, the greater the stress value. For example, use may be made of a sigmoidal function or similar nonlinear function for causing the stress value to sharply increase with an increase in collision ratio $c_i(t)$.

The function $S_i(t)$ defined by the expression (19) is representative of a value produced by storing or time-integrating stress values $s(c_i(t))$ at times t. A time interval for storage is between a time ts at which a random phase shift is executed in accordance with a stress value $S_i(t)$ stored previously and the current time t. More specifically, the function $S_i(t)$ is reset when a random phase shift is executed, and again starts storing stress values s ($c_i(t)$). When the time t is provided in a discrete form, the integration of the function $S_i(t)$ may be implemented as a sum of stress values $S_i(t)$ at each time. The stored stress $S_i(t)$ is calculated by the stored stress calculator 33.

The function q ($S_i(t)$) defined by the expression (18-1) or (18-2) produces a random number with a probability corresponding to the stored stress value $S_i(t)$. The function produces a value μ at the probability of $S_i(t)$ and produces zero at the probability of $1-S_i(t)$. The value μ is a random number lying in the range of $\epsilon \leq \mu < \delta$ where $\epsilon$ and $\delta$ are constant parameters determined by experiments.

The stress response function $\xi(S_i(t))$ evaluates the stored stress value $S_i(t)$ every n-th period and produces a random value μ or zero with the probability according thereto. The stress response function $\xi(S_i(t))$ is calculated by the stress response function calculator 34.

It follows from the above that, as the expression (5) indicates, by introducing the stress response function $\xi(S_i(t))$ in the model of nonlinear oscillation, it is possible to evaluate the stored stress value. $S_i(t)$ every n-th period and execute the random phase shift with probability based on the evaluated stress value $S_i(t)$. More specifically, the more the stress values caused by collision, the higher the probability with which the random phase shift is executed. At times other than those corresponding to the integral multiples of the n periods, the stress response function value $\xi(S_i(t))$ is zero, so that the random phase shift is not executed. However, it should be noted that the period of time during which the stress is stored is not limited to the n periods stated above, but may be the time interval between the time ts at which a random phase shift has been executed previously and the current time t. This means that, e.g. when the stress value s ($c_i(t)$), even if small, is continuously accumulated over a period of time longer than the n periods, the cumulative stress value $S_i(t)$ ultimately becomes extensive and may cause the random phase shift to be executed.

The phase calculator 31 uses the stress response function value $\xi(S_i(t))$ to calculate the phase $\theta_i(t)$ determined by the expression (5).

The transmission timing calculator 12, suitably executing the sequence described above, may be implemented by software or hardware executing the operations with electronic circuits, or even by the combination of software and hardware.

The operation defined by the expression (5) may be implemented on a communication node by general-purpose software, e.g. a Runge-Kutta method, which is one of methods using a difference expression, or recurrence expression, resulting from the differentiation of a differential expression, or making the continuous time variable t discrete, i.e. quantization, to calculate a change, or temporal development, of a state variable. Runge-Kutta method is taught as a general background knowledge in H. Togawa, "Scientific Engineering Calculation Handbook by UNIX Workstation—Volume Fundamental, C-Language Version" published by Saiensusha Co., Ltd., Tokyo, for example.

Each node performs the operations represented by the expressions (5) and (6), so that an adequate phase relation is established between nodes lying in the interaction range. For example, assuming a condition of m=n+1, then a given node i selects a type different from the type of nodes lying in the n-th neighboring range, establishing a significant phase difference. Also, the node i is synchronous or coincident in phase to or with, among a set of nodes lying in the (n+1)-th neighboring range except for nodes lying in the n-th neighboring range, a node selecting the same type as the own node i. If such a condition is established throughout the entire nodes, then the nodes of a node set lying in the n-th neighboring range other than the node i and held in a positional relation free from a collision between their transmissions is synchronized to each other. It follows that the phase difference which the node i forms between it and the other nodes lying in the n-th neighboring range can be increased by an amount corresponding to the number of such nodes synchronized in phase to each other, allowing the node i to obtain a greater time slot than conventional.

As stated above, in the illustrative embodiment, the node type selector 17 selects the type information of the own node on the basis of the type information of neighboring nodes while the transmission timing calculator 12 implements, based on the output of the node type selector 17 and the timing signals of neighboring nodes, the transmission timings of a plurality of nodes, i.e. effects phase diffusion synchronization alliance. The illustrative embodiment therefore successfully realizes optimum time-division telecommunication even when nodes are not located in a lattice pattern.

Consequently, the nodes of a node set lying in the n-th neighboring range other than the node i and held in a positional relation free from a collision between their transmissions are synchronized in phase to each other. It follows that the phase difference which the node i establishes between it and the other nodes lying in the n-th neighboring range can be increased by an amount corresponding to the number of such nodes synchronized in phase to each other, allowing the node i to obtain a broader time slot than those obtainable with the conventional methods.

A second or alternative embodiment of the present invention will be described hereinafter. The first embodiment described above is configured such that, after type selection by the node type selector 17 has converged, the transmission timing calculator 12 calculates a transmission timing on the basis of the output of the node type selector 17. Stated another way, in the first embodiment, node type selection is once separated from transmission timing calculation and repeatedly executed as preprocessing. By contrast, the second embodiment executes node type selection and transmission timing calculation in parallel.

Figure 9:
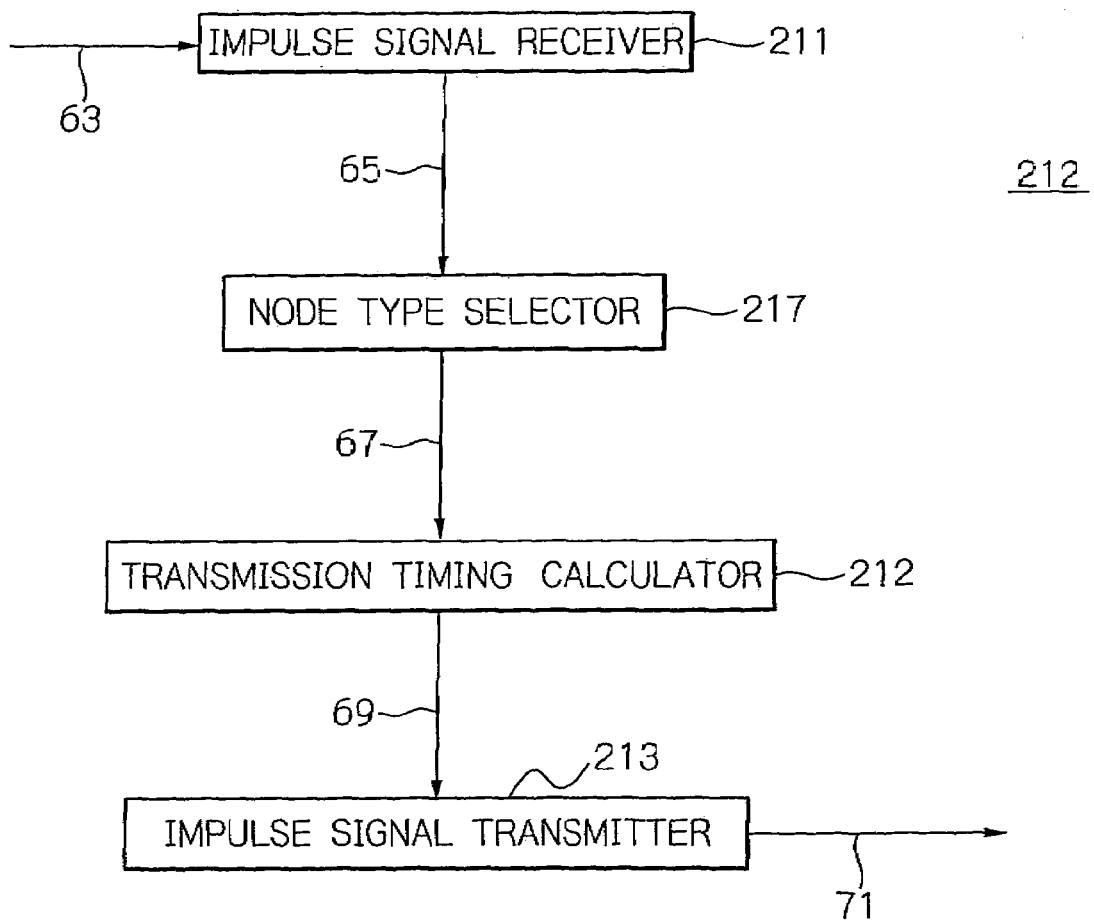
FIG. 9 is a schematic block diagram showing another specific configuration of the transmission timing calculator representative of a second embodiment of the present invention.

FIG. 9 shows a specific configuration of a transmission timing calculator 212 unique to the alternative embodiment. The alternative embodiment may be the same as the previous embodiment except for the two major points. First, the alternative embodiment does not include the node type signal receiver 18 nor the node type signal transmitter 19, but uses, from the beginning of the execution, the impulse signal receiver 11 and impulse signal transmitter 13 for transmitting and receiving an impulse signal with node type information, such as node type information of another node j and nodes neighboring it, added to the impulse signal. Second, the alternative embodiment inputs, every time a node type selector 217 updates type selection, the result of the updated type selection to the transmission timing calculator 212 so as to cause the latter to reflect the result on the calculation of the transmission timing of an impulse signal.

The following description will concentrate mainly on the operations of the node type selector 217 and transmission timing calculator 212 unique to the alternative embodiment. Structural elements like those of the first embodiment are not shown, and detailed description thereon will not be made in order to avoid redundancy.

The transmission timing calculator 217 includes an impulse signal receiver 211, which is adapted to receive an impulse signal 63 emitted from a neighboring node. In the alternative embodiment, the impulse signal 63 conveys the type information of a neighboring node added thereto, as stated above. Therefore, the impulse signal receiver 211 separates type information contained in the received impulse signal 63 and then delivers a signal 65 representing the type information and impulse signal to the node type selector 217. The node type selector 217 is adapted to be responsive to the signal 65 to select the type information of the own node and feeds node type information 67 to the transmission timing calculator 212 every time it selects or updates the node type information.

It is to be noted that the type information added to the signal 65 including the impulse signal 63 and output from the impulse signal receiver 211 contains not only the own node type information $\tau(i)$ but also the type information received from the neighboring node. To select type information, the node type selector 217 also uses the expressions (1) through (4) described in relation to the previous embodiment.

The transmission timing calculator 212 is adapted for receiving the signal 67 including the type information and another node's impulse signal from the node type selector 217 to determine a timing for transmitting an output impulse signal Sout11. The method of calculating a transmission timing may be the same as the method described in connection with the previous embodiment and will not be described specifically in order to avoid redundancy.

Assume that the type information of neighboring nodes to be dealt with by the node type selector 17 of the own node are $\tau(O1), \tau(O2), \ldots, \tau(On)$. Then, an impulse signal transmitter 213, having its input port 69 interconnected to the node type selector 217, is adapted for transmitting the impulse signal 71 to a node range which is m hops apart from the own node and broader than the node range which is n hops apart from the own node, as stated earlier in connection with the previous embodiment. For example, each node transmits an impulse signal to a node range (n+1) hops apart from the node. Various methods are available for the transmission of an impulse signal to nodes m hops away from the own node. The transmission may be implemented by relaying the impulse signal by other nodes by a certain method. Alternatively, the impulse signal may be transmitted on an electromagnetic having its strength great enough to directly reach the nodes m hops apart from the own node, in which case relaying is not necessary, of course.

Figure 10:
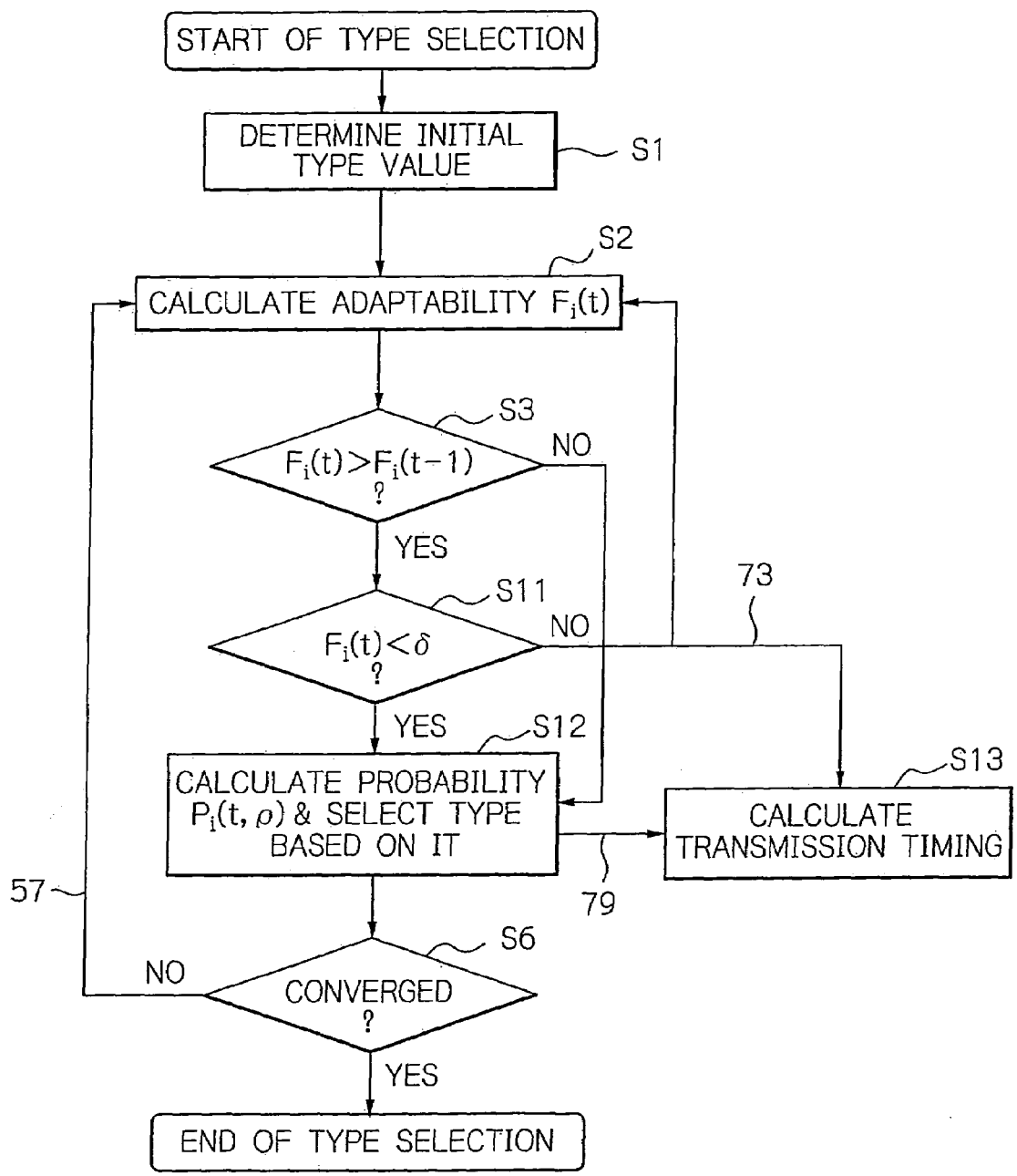
FIG. 10 is a flowchart useful for understanding a specific type selection procedure executed by a node type selector included in the second embodiment.

A specific operation of the alternative embodiment will be described with reference to FIG. 10, which demonstrates the type selection procedure executed by the node type selector 217 by using the expressions (1) through (4) in connection with the selection processing and transmission timing calculation. FIG. 10 partially includes some of the steps shown in FIG. 6 and designated with the same step numbers, and detailed description thereof will not be made in order to avoid redundancy.

As shown in FIG. 10, the node type selector 217 determines adaptability $F_i[t]$ at a time t and then determines whether or not the adaptability $F_i[t]$ is greater than adaptability $F_i[t-1]$ determined at a time t−1 (step S3), as in the previous embodiment. If the adaptability $F_i[t]$ is greater than the adaptability $F_i[t-1]$ (YES, step S3), then the node type selector 217 determines whether or not the adaptability $F_i[t]$ is smaller than a random number δ (step S11). If the adaptability $F_i[t]$ is equal to or greater than the random number δ (NO, step S11), then, as depicted with a connection 73, the node type selector 217 does not update the type selection at the time t, but calculates adaptability at the next time t+1 and reports such processing to the transmission timing calculator 212 for thereby causing it to calculate a transmission timing in accordance with the non-updated type information (step S13).

On the other hand, if the adaptability $F_i[t]$ is equal to or smaller than the adaptability $F_i[t-1]$ (NO, step S3) or $F_i[t]$ is smaller than the random number δ (YES, step S11), then the node type selector 217 calculates the probability of selection $P_i[t,\rho]$ of each type ρ and then selects one of the types, i.e. updates data selection on the basis of the selection probabilities of the individual types ρ thus calculated (step S12). Subsequently as depicted with a connection 79, the node type selector 217 reports the updating of the type selection to the transmission timing calculator 212 for thereby causing it to calculate a transmission timing based on the updated type selection (step S13).

In the step S6 following the step S12, whether or not the type selection processing by the node type selector 217 has converged is determined in the same manner as in the previous embodiment. When such processing converges, a type to be selected by the own node is fixed. This is the end of the type selection procedure. At this instant, in FIG. 10, only the operation of the transmission timing calculator 212 is executed. If desired, when a preselected period of time elapses since the conversion of the node type selection processing, i.e. when neighboring nodes are also expected to be in a converged state, only the type information $\tau i$) of the own node i may be added to an impulse signal to be transmitted.

The alternative embodiment achieves the same advantages as the previous embodiment. In addition, the alternative embodiment allows a node configuration to be scaled down because it does not include a node type transmitter/receiver.

A third, or further alternative embodiment of the present invention will be described hereinafter. The third embodiment is identical with the first and second embodiments except for the phase calculating method of the transmission timing calculator. More specifically, the third embodiment differs from the second and third embodiments as to the expressions used by the transmission timing calculators 12 and 212 for the calculation of a phase.

In the third embodiment, the transmission timing calculator 12 or 212 generates a pseudo-phase signal by use of a virtual phase model in accordance with, e.g. the following expressions:

$$\frac{d\theta_i(t)}{d_t} = \omega_i + \frac{K_x}{N_x}\sum_{j\in X_i} R(\Delta\theta_{ij}(t)) + \frac{K_y}{N_y}\sum_{j\in Y_i} H(\Delta\theta_{ij}(t)) + \xi(S_i(t)) \quad (20\text{-}1)$$

$$\Delta\theta_{ij}(t) = \theta_j(t) - \theta_i(t) \quad (20\text{-}2)$$

where $N_x$ and $K_x$, included in the member including the phase response function $R(\Delta\theta_{ij}(t))$, respectively denote the number of elements constituting a node set $X_i$ and an association constant parameter, and $N_y$ and $K_y$, included in the member including the synchronization alliance function $H(\Delta\theta_{ij}(t))$, respectively denote the number of elements constituting a node set $Y_i$ and an association constant parameter.

Thus, in the third embodiment, an impulse signal is used as an interaction signal while a pseudo-phase signal is used for the calculation of a transmission timing. The association constant parameters $K_x$ and $K_y$ are parameters respectively determining the degree of contribution of the member including the function $R(\Delta\theta_{ij}(t))$ and that of the member including the function $H(\Delta\theta_{ij}(t))$ to the variation of the phase in the time domain. The association constants $K_x$ and $K_y$ may be determined by experiments.

As stated above, the third embodiment achieves the same advantages as the first and second embodiments. In addition, by generating a pseudo-phase signal by using a virtual phase model, the third embodiment enhances the accuracy of phase calculation assigned to the transmission timing calculator 12 or 212 for thereby further stabilizing the establishment of a phase relation between nearby nodes.

A still further alternative, fourth embodiment of the present invention will be described hereinafter. In the first, second and third embodiments, it is assumed that the number of types Ntyp stored in the node type selectors 17 or 217 is the same throughout the nodes of the telecommunications system and is determined by experiments beforehand. By contrast, in the fourth embodiment to be described, each node additionally includes a number-of-types determining circuit for autonomously determining the number of types at the time of type selection and can therefore store a particular number of types Ntyp. Further, the number of types Ntyp is determined during the processing of the node type selector. Consequently, even when the disposition density of nodes, for example, is locally different in a telecommunications network, the number of types of nodes Ntyp autonomously adapts to the density node by node, allowing each node to obtain a particular time slot divided by a number adequate for each area.

Figure 11:
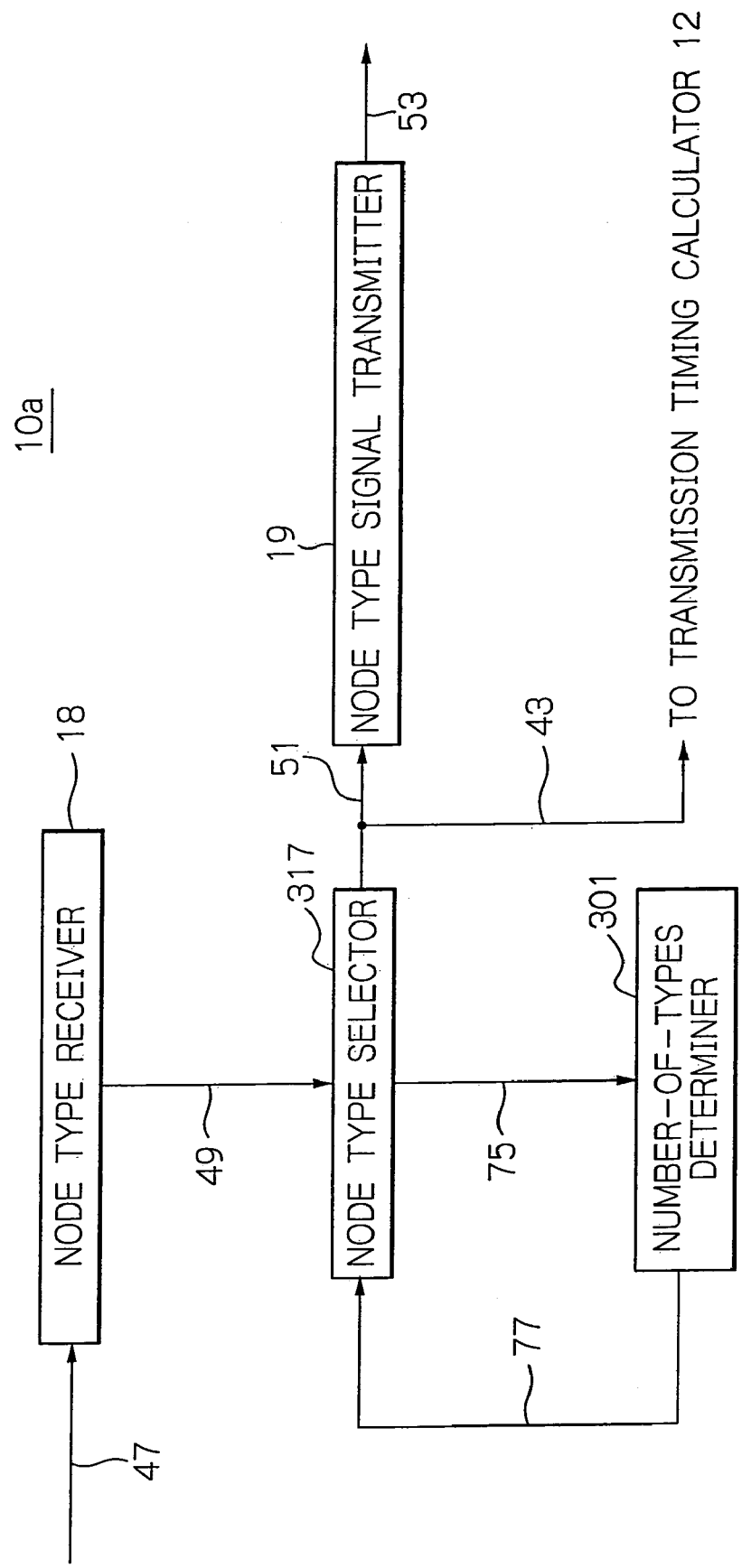
FIG. 11 is a schematic block diagram showing a fourth embodiment of the node in accordance with the present invention.

FIG. 11 is a schematic block diagram showing the major part of a node 10a unique to the fourth illustrative embodiment. As shown, the node 10a includes a number-of-types determiner 301 connected to a node type selector 317. It is to be noted that the circuitry shown in FIG. 11 corresponds to the circuitry shown in FIG. 2 except that the number-of-types determiner 301 is added. In addition, FIG. 11 does not specifically show the transmission timing calculator 12 and other circuits shown in FIG. 2 merely in order to clearly indicate the relation between the number-of-types determiner 301 and node type selector 317. The structural features of the fourth embodiment may, of course, be applied to the second or the third embodiment, if desired.

The node type selector 317 is adapted to select the type of the own node on the basis of the type information of neighboring nodes stored in the same manner as in the first embodiment, while feeding adaptability $F_i[t]$, 75, determined at each time t to the number-of-types determiner 301. The number-of-types Ntyp determined by the number-of-types determiner 301 is input to the node type selector 317 as depicted with a connection 77. If the number of types Ntyp has not been updated over a predetermined period of time, then the node type selector 317 determines that the number of types Ntyp has been converged and fixed, and selects the own node's type by use of the fixed number of types as in the first embodiment.

More specifically, upon receiving the adaptability $F_i[t]$ input from the node type selector 317 at each time t and if the maximum adaptability maxFi is not updated over preselected part of a predetermined period, the number-of-types determiner 301 determines a stress value zi by means of the expression:

$$z_i = 1 - \frac{\sum_{\lambda=0}^{M} F_i[t-\lambda]}{M+1} \quad (21)$$

where the second member of the right side denotes the mean value of the adaptabilities $F_i[t]$ to occur when the maximum value maxFi is not updated over the predetermined period of time. The adaptability $F_i[t]$ is a variable lying in the range of $0<F_i(\sigma)\leq 1$. Therefore, the stress value zi is representative of the mean value of non-adaptability to occur when the maximum value maxFi is not updated over the predetermined period of time.

When a cumulative stress value Zi exceeds a threshold value $\epsilon$, the number-of-types determiner 301 updates the number of types Ntyp and reports the resulting new number 77 of types to the node type selector 317.

Figure 12:
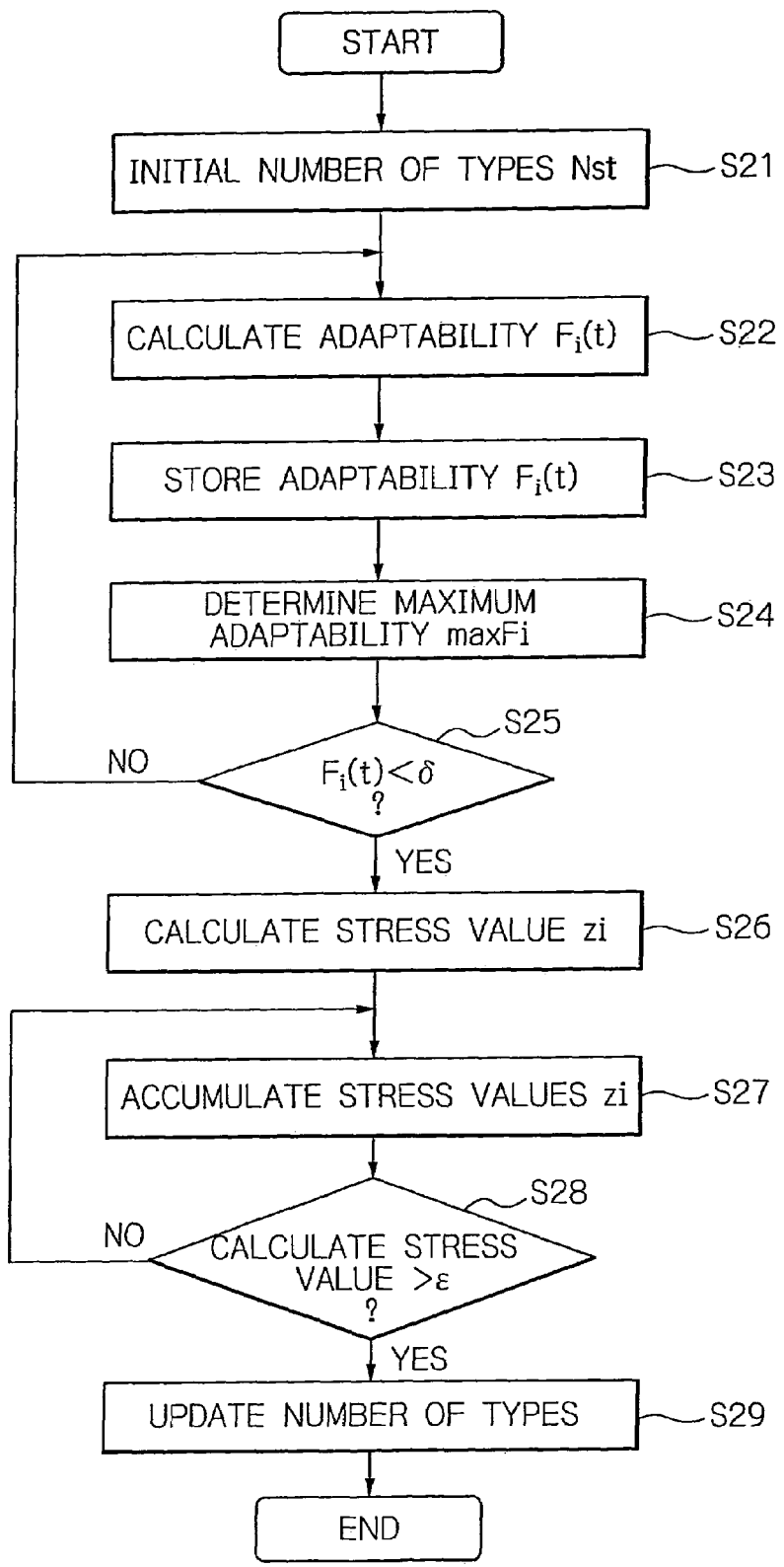
FIG. 12 is a flowchart useful for understanding a specific number-of-types determining operation unique to the fourth embodiment.

Reference will be made to FIG. 12 for describing a specific procedure in which the fourth embodiment causes each node i to autonomously determine the number of types Ntyp. As shown, assume that the number of types Ntyp initially stored in a node i is Nst (step S21). The initial value Nst is a constant parameter determined by experiments beforehand and may be "5" at all nodes by way of example.

After the step S21, the node type selector 317 starts calculating adaptability $F_i[t]$ as in the first embodiment (step S22). At the same time, the node type selector 317 delivers adaptability $F_i[t]$ determined at each time t to the number-of-types determiner 301. Every time the number-of-types determiner 301 receives the adaptability $F_i[t]$ of each period calculated by the node type selector 317, the determiner 301 stores the adaptability $F_i[t]$ and sequentially stores consecutive adaptabilities up to M periods before the current time t $\{F_i[t], F_i[t-1], F_i[t-2], \ldots, F_i[t-M]\}$ (step S23).

Subsequently, the number-of-types determiner 301 determines the maximum value maxFi of a set of adaptabilities $\{F_i[t], F_i[t-1], F_i[t-2], \ldots, F_i[t-M]\}$ stored therein and holds the maximum value maxFi (step S24). At this instant, the number-of-types determiner 301 compares the maximum adaptability maxFi with the adaptability $F_i[t]$ at the current time t on a period basis, and updates the maximum adaptability maxFi if it is smaller than the current adaptability $F_i[t]$. It should be noted that if the current adaptability at the time t is "1" when the maximum adaptability maxFi is "1", then the subsequent steps are executed on the assumption that the maximum adaptability has been updated.

When the maximum adaptability maxFi is not updated over the predetermined period of time, e.g. a plurality (L) of consecutive periods, L being a natural number, a stress value represented by the expression (21) indicated above is produced (steps S25 and S26). It should be noted that the expression (21) is only illustrative and may be replaced with any other suitable expression.

The stress value zi is calculated every time the maximum value maxFi is not updated over the predetermined period of time, and is added to the variable Zi representative of a cumulative stress value which is initially zero (step S27). When the cumulative stress value Zi becomes greater than the threshold value $\epsilon$ (YES, step S28), the number of types Ntyp is updated with probability $\delta$ (step S29). It is to be noted that $\epsilon$ and $\delta$ are constant parameters determined by experiments. At the same time, the cumulative stress value Zi is reset to zero.

The number of types Ntyp is updated in accordance with Ntyp[t+1]=Ntyp[t]+1, where Ntyp[t] denotes the number of types at a time t.

If the number of types is not updated over a predetermined period of time, as determined by the procedure stated above, it is determined that the number of types has converged. After such a procedure, the transmission timing calculator 12, FIG. 2, operates in the same manner as in the first embodiment when the processing of the node type selector 317 converges.

The procedure of the fourth embodiment shown in FIG. 12 has been described as applied to the first embodiment. It may alternatively be applied to the second or the third embodiment, if desired.

As stated above, in accordance with the fourth embodiment, each node 10a includes the number-of-types determiner 301 for autonomously determining the number of types of nodes Ntyp. Therefore, even when the disposition density of nodes, for example, is locally different in a telecommunications network, the number of types of nodes Ntyp autonomously adapts to the density node by node, allowing each node to obtain a particular time slot divided by a number adequate for each area and therefore enhancing efficient communication. Of course, the fourth embodiment achieves the same advantages as the first, second and third embodiments as well.

A fifth, still further embodiment of the present invention will be described hereinafter with reference also made to FIG. 11. The fifth embodiment is similar to the fourth embodiment described above except for the following. The fourth embodiment determines the number of types Ntyp by sequentially increasing it from the initial value Nst in the event of type selection, so that the number of types Ntyp increased is not decreased afterward. This, however, gives rise to a problem that, because each node 10a increases the number of types Ntyp independently of the other nodes, it is likely that the number of types Ntyp becomes greater than the optimum value and converges. To solve this problem, in the fifth embodiment to be described, the number-of-types determiner 301 is designed for not only increasing the number of types Ntyp but also decreasing it, as the case may be.

More specifically, in the fifth embodiment, the number-of-types determiner 301 is adapted to selectively increase or decrease the number of types of nodes in accordance with the time-serial adaptability information 75 fed from the node type selector 317. The method of increasing the number of node types executed by the determiner 301 differs from the method of the fourth embodiment, and will also be described specifically. While the sequence of steps shown in FIG. 11 is applied to the node configuration of the first embodiment shown in FIG. 1, it is similarly applicable to the node configuration of the second or the third embodiment.

In the fifth embodiment, the number-of-types determiner 301 is structured to execute the processing, which will be described later, in accordance with adaptability $F_i[t]$ fed from the node type selector 317 at each time t, thereby increasing or decreasing the number of types Ntype. The number-of-types determiner 301 then reports the resulting new number 77 of types Ntyp to the node type selector 317.

Figure 13:
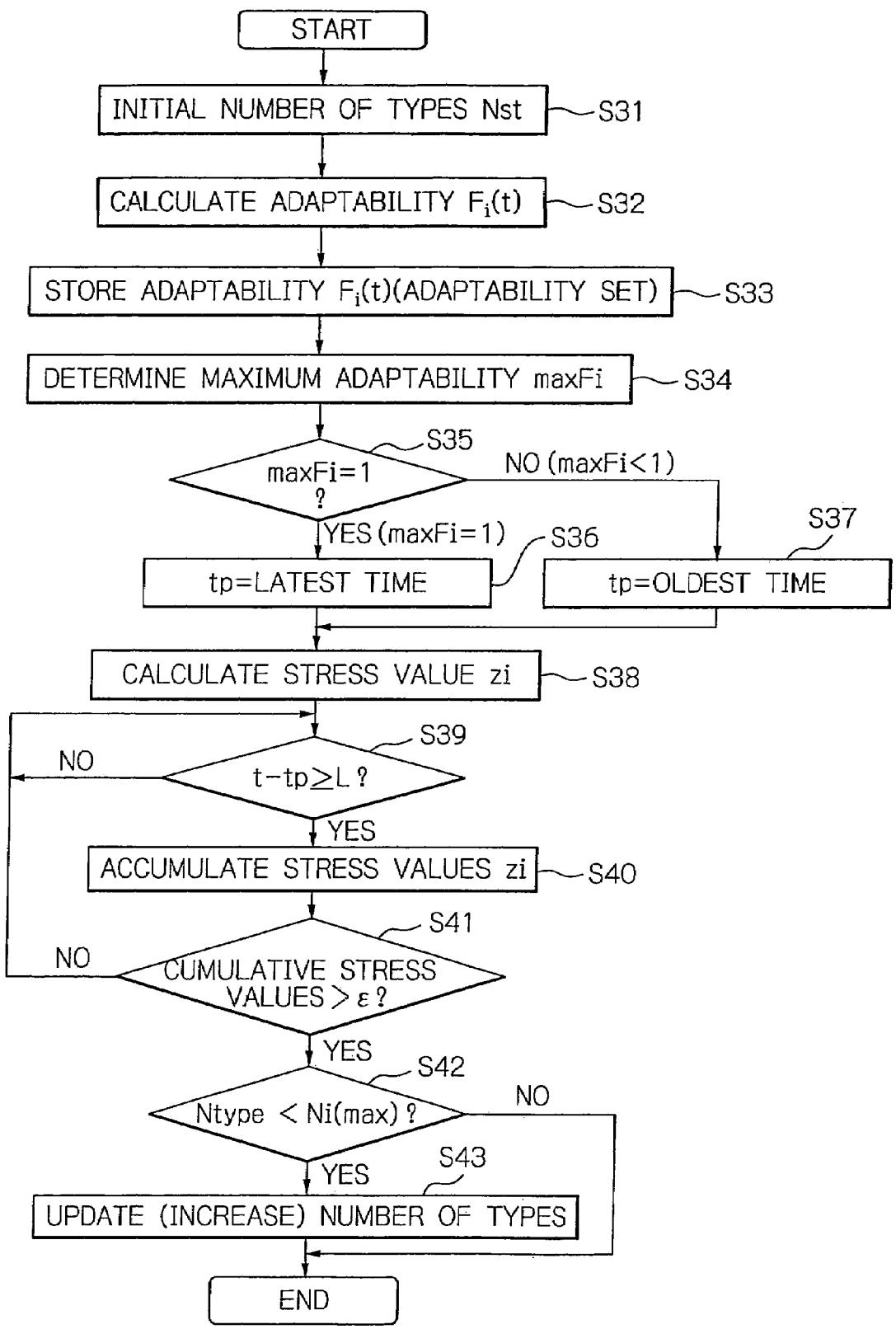
FIG. 13 is a flowchart useful for understanding specific number increasing processing included in a number-of-types determining operation representative of a fifth embodiment of the present invention.
Figure 14:
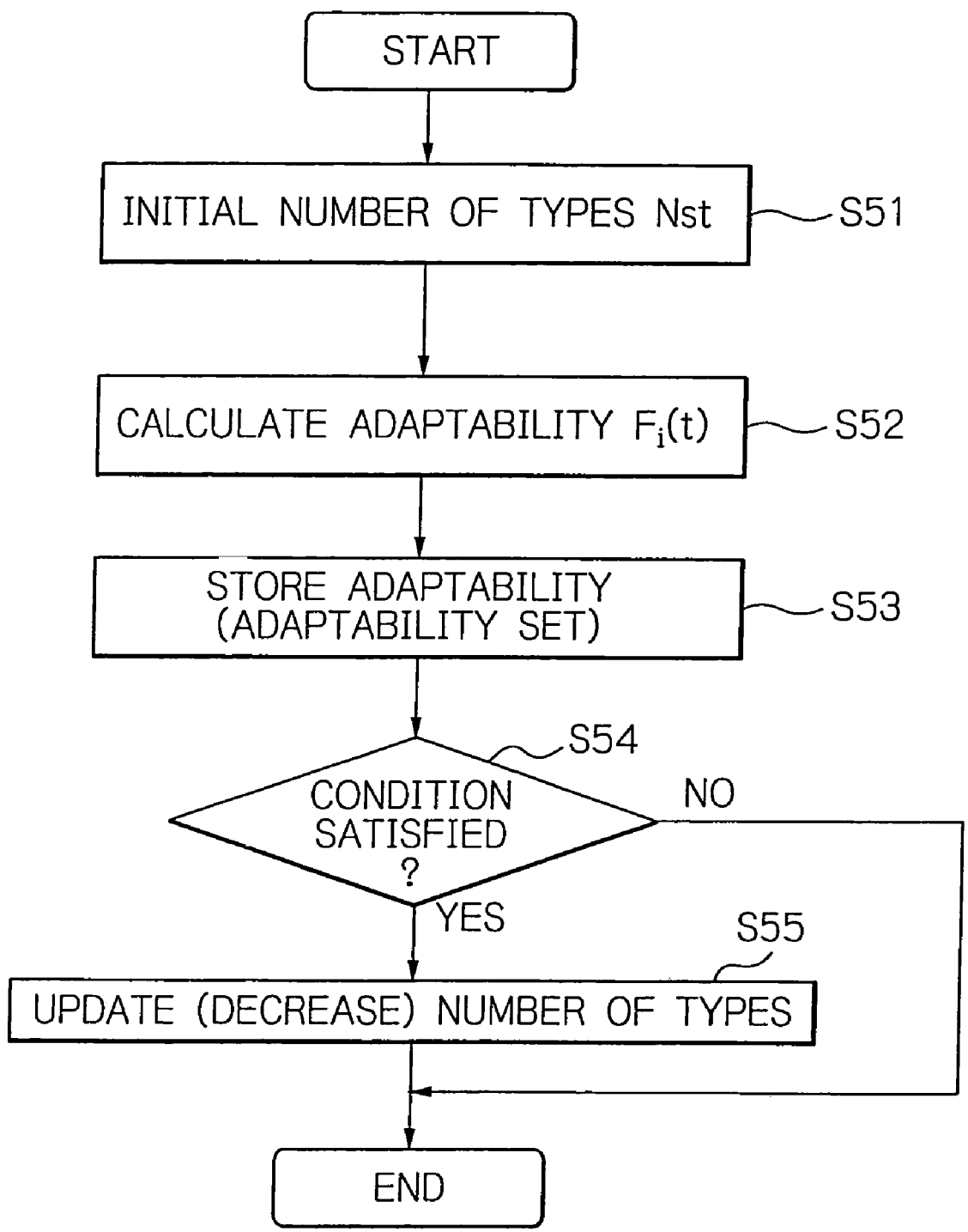
FIG. 14 is a flowchart useful for understanding specific number decreasing processing also included in the number-of-types determining operation of the fifth embodiment.

How the number-of-types determiner 301 of the fifth embodiment allows the own node i to autonomously determine the number of types Ntyp will be described with reference to FIGS. 13 and 14. FIGS. 13 and 14 demonstrate procedures for decreasing and increasing the number of types Ntyp, respectively.

As shown in FIG. 13, the number of types Ntyp initially stored in the node i is set to Nst (step S31). Again, the initial value Nst is a constant parameter determined by experiments beforehand and may be "5" at all nodes by way of example. After the step S31, the node type selector 317 starts calculating adaptability $F_i[t]$ as in the first embodiment (step S32) while feeding the adaptability $F_i[t]$ thus calculated to the number-of-types determiner 301.

Every time the number-of-types determiner 301 receives the adaptability $F_i[t]$ calculated by the node type selector 317 every period, the determiner 301 stores the adaptability $F_i[t]$ and sequentially stores consecutive adaptabilities up to M periods before the current time t $\{F_i[t], F_i[t-1], F_i[t-2], \ldots, F_i[t-M]\}$ (step S33). Subsequently, the number-of-types determiner 301 determines the maximum value maxFi of the set of adaptabilities thus stored, or an adaptability set as referred to hereinafter, (step S34).

Generally, two or more of the elements ($F_i[t], F_i[t-1], F_i[t-2], \ldots, F_i[t-M]$), constituting the adaptability set, may give the maximum value maxFi. Stated another way, the adaptability may have the maximum value maxFi at a plurality of times. In light of this, the illustrative embodiment determines a reference time tp for giving the maximum value maxFi, as will be described hereinafter.

If the maximum value maxFi is equal to "1" (YES, step S36), the latest one of the times included in the adaptability set and giving the maximum value maxFi is selected as a reference time tp (step S36). On the other hand, if the maximum value maxFi is smaller than "1" (NO, step S35), then the oldest time farthest from the current time t is selected as a reference time tp (step S37).

After the step S36 or S37, there is calculated a stress value zi by the following expression (step S38):

$$z_i = 1 - \left( \frac{\sum_{\lambda=0}^{M} \exp(-c \cdot \lambda) \cdot F_i[t-\lambda]}{\sum_{\lambda=0}^{M} \exp(-c \cdot \lambda)} \right)^2 \quad (22)$$

where exp(*) denotes an exponential function, c denotes a constant parameter determined by experiments, and the parenthesized member of the second term on the right side denotes a weighted mean of adaptabilities $F_i[t]$.

Assuming that c is greater than zero, then a weighting factor assigned sequentially increases in order of $F_i[t], F_i[t-1], \ldots, F_i[t-M]$. Stated in another way, the closer the adaptability to the current time t, the higher the degree of contribution to the stress value is. Further, because the adaptability $F_i[t]$ is a variable lying in the range of $0 < F_i(\sigma) \leq 1$, the stress value Zi is representative of non-adaptability calculated on the basis of the weighted mean of adaptabilities $F_i[t]$.

If a difference between the current time t and the reference time tp giving the maximum value maxFi is equal to or greater than a preselected period of time (YES, step S39), then the stress value zi is added to the variable Zi representative of a cumulative stress value (step S40). The preselected period of time mentioned above is assumed to be a plurality (L) consecutive periods, L being a natural number. The initial value of the stress value Zi is zero, i.e.

$$\text{if } t-tp \geq L, \; Zi[t+1] = Zi[t] + zi[t], \quad (23)$$

where Zi[t] and zi[t] respectively denote a cumulative stress value and a stress value at the time t.

The difference t−tp is evaluated every period. Every time the relation of $t-tp \geq L$ is satisfied, the stress value zi is added to the cumulative stress value Zi. Assume that the cumulative stress value Zi increases above the threshold value $\epsilon$ (YES, step S41). Then, it is determined (step S42) whether or not the number of types Ntype is smaller than Ni (max), which is a constant parameter giving the maximum value of the number of types and determined by experiments. If the answer of the step S42 is YES, then the number of types Ntyp is updated, or increased, with probability δ (step S43). At the same time, the cumulative stress value Zi is rest to zero. In the step S43, the number of types is updated by the following expression:

$$Ntyp[t+1]=Ntyp[t]+1, \quad (24)$$

where Ntyp[t] denotes the number of types at the time t.

By the above procedure, the number of types increases with respect to probability every time the cumulative stress value Zi exceeds the threshold value ε. The processing represented by the expressions (23) and (24) has the following significance.

When the maximum value maxFi is equal to "1", the difference t−tp is relatively small and, in many cases, smaller than the preselected period L, maintaining the cumulative stress value Zi the same. Conversely, when the maximum value maxFi is smaller than "1", the difference t−tp is relatively great and, in many cases, greater than the period of time L inclusive, causing a stress value zi to be added to the cumulative stress value Zi. Therefore, so long as maxFi is smaller than "1", stress values are frequently added to the cumulative stress value Zi. However, when maxFi becomes "1", the cumulative stress value Zi stops increasing because hardly any stress value zi is added thereto. This is successful to implement a condition wherein when maxFi becomes "1", the number of types stops increasing.

Next, the procedure for decreasing the number of types executed by the number-of-types determiner 301 will be described with reference to FIG. 14. As shown, after the initial value Nst of the number of types of the node i has been stored (step S51), the node type selector 317 calculates adaptability $F_i[t]$ (step S52) while the number-of-types determiner 301 stores adaptabilities $F_i[t]$ up to M periods before the current time t $\{F_i[t], F_i[t-1], F_i[t-2], \ldots, F_i[t-M]\}$ (step S53). Such consecutive adaptabilities will be referred to as an adaptability set hereinafter.

Subsequently, the number-of-types determiner 301 determines whether or not the elements of the above adaptability set satisfy a certain condition each (step S54) and, if the answer of the step S54 is YES, reduces the number of types (step S55), as represented by:

$$\text{if } \frac{\sum_{\lambda=0}^{M} F_i[t-\lambda]}{M+1} = 1 \text{ and } Nst < Ntyp[t], \text{ then} \quad (25)$$

$$Ntyp[t+1] = Ntyp[t] - 1$$

The above condition means that the elements of the adaptability set, i.e. the adaptabilities over the past plural (M) periods as counted from the current time t all be "1" and that the current number of types Ntyp[t] be greater than the initial value Nst. If adaptability is "1", which is the maximum value, over (M+1) consecutive periods, i.e. an interval between a time M periods before the current time and the current time, then it is likely that the number of types is greater than and settled at the optimum value. In this case, the number-of-types determiner 301 reduces the number of types in accordance with the expression (25) for thereby allowing the number of types to converge to the optimum value more frequency than in the fourth embodiment and therefore implementing more stable operations.

The condition that adaptability be continuously "1" over the (M+1) periods, as defined in the expression (25), is only illustrative and may be replaced with a condition that adaptability be continuously greater than a preselected threshold value over a preselected period of time, if desired.

With the above procedure, the fifth embodiment determines that when the number of types is not updated for more than a predetermined period of time, the number of types has converged or is fixed. Subsequently, the fifth embodiment causes the transmission timing calculator to operate after the operation of the node type selector.

As stated above, the fifth embodiment additionally includes the number-of-types determiner 301 for allowing the own node to autonomously determine the number of types N-typ, i.e. selectively increase or decrease the number of types N-typ. Therefore, in a telecommunications network including a plurality of nodes, even when the distribution density of nodes, for example, is different from area to area, the number of types of nodes Ntyp autonomously adapts to the density node by node more stably than the fourth embodiment, allowing each node to obtain a particular time slot divided by a number adequate for each area and hence further enhancing efficient communication. The fifth embodiment, of course, achieves the same advantages as the first to fourth embodiments as well.

The first to fifth embodiments shown and described may be changed or modified, as will be described hereinafter. While in the first embodiment, the specific angular frequency parameter $\omega_i$ is assumed to be uniform in the entire system, it may, of course, differ from one node to another node. For example, the specific angular frequency parameter $\omega_i$ may be slightly distributed around a reference value in accordance with the Gaussian distribution or similar probability distribution.

Although the first to fifth embodiment all assume a system in which a number of spatially distributed nodes transmit and receive data with each other by radio, the present invention is similarly applicable to a system in which spatially distributed nodes transmit and receive data with each other by wire, e.g. Ethernet (trade name) or similar wired LAN system. Further, the present invention is applicable even to a network in which different kinds of nodes, e.g. wire-connected sensors and actuators or servers exist together or a network in which wire-connected nodes and radio or wireless nodes exist together.

The present invention may be used as a communication protocol that allows routers arranged on the Internet to transmit and receive data of a routing table at different timings from each other. Here, a router refers to a relaying apparatus configured to route each information flowing on a network to a particular destination, i.e. having a communication path selecting function. Also, a routing table refers to a communication path selection rule to be referenced at the time of routing of the above information. To implement efficient communication, it is necessary to update the routing table in succession in accordance with, e.g. modifications on a network or local traffic changes. For this purpose, a number of routers present on a network transmit and receive a routing table with each other at predetermined intervals.

However, it is known that despite that each router transmits a routing table independently of the other routers, transmissions from different routers are gradually brought into synchronization or collision, as taught in Floyd, S. and Jacobson V. "The Synchronization of Periodic Routing Messages", IEEE/ACM Transactions on Networking, Vol. 2, No. 2, pp. 122-136, April 1994, as a general background knowledge. This document proposes to cope with the above synchronization by randomly varying the processing period of each node as to a communication protocol for the transmission and reception of a routing table and describes advantages achievable with such a method. However, the method proposed in the above document basically relies on randomness and is therefore not sufficiently effective.

By contrast, the present invention successfully solves the problem stated above by allowing nearby routers to autonomously adjust a time slot for the transmission of a routing table in cooperation with each other. The present invention is therefore capable of achieving more desirable effects than the method taught in the document mentioned above.

As stated above, the present invention successfully avoids collisions or synchronization of transmission data on a telecommunications network without regard to whether or not the network is wired, and can therefore be used as a communication protocol implementing efficient data communications with adaptability and stability.

The present invention is featured with control over the acquisition of communication timing information, i.e. a phase signal in the illustrative embodiments, so that how the timing information is used for communication is not a question. For example, when the transmission frequency of a data signal is different between nodes, communication may be effected without setting time slots, in which case the start of data transmission will be determined in accordance with transmission timing information.

While specific examples of the phase response function $R(\Delta\theta ij(t))$ are shown and described in the first to fifth embodiments, they are only illustrative and may be replaced with any other suitable functions.

In the first to fifth embodiments, the collision ratio $ci(t)$ is reflected by the phase $\Delta\theta_i(t)$ as both of a stress response function value and the switching characteristic of a phase response function $R(\Delta\theta_{ij}(t))$. Alternatively, the collision ratio $ci(t)$ may be reflected by the phase $\Delta\theta_i(t)$ only as the characteristic switching of a phase response function $R(\Delta\theta_{ji}(t))$, if desired.

In the fifth embodiment, the number-of-types determiner is capable of reducing the number of types. The function of reducing the number of nodes may however be applied to the number-of-types determiner of the fourth embodiment as well in order to allow it to selectively increase or decrease the number of node types, as the case may be.

The entire disclosure of Japanese patent application No. 2005-024175 filed on Jan. 31, 2005, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A communication control apparatus mounted on a network node constituting a telecommunications system, comprising:
   a node type information transmitter/receiver for receiving node type information selected by a neighboring node, and transmitting node type information selected by the network node and node type information of another node;
   a state variable signal transmitter/receiver for receiving a state variable signal of the neighboring node reflecting a phase representative of a timing of data transmission from the neighboring node, and transmitting a state variable signal representative of a timing of data transmission from the network node;
   a node type selector for selecting a node type of the network node in accordance with node type information of the other node received via said node type information transmitter/receiver; and
   a transmission timing calculator operative in response to the node type information of the network node selected by said node type selector, the node type information of the other node and the state variable signal of the neighboring node for varying a state of the phase of the network node in accordance with a time evolution rule based on a phase response function and a synchronization alliance function for thereby determining a data transmission timing of the network node, the time evolution rule changing a nonlinear oscillation rhythm of the phase of the network node in response to an impulse signal received from the neighboring node.

2. The apparatus in accordance with claim 1, wherein said node type selector comprises:
   a type selection probability calculator for determining easiness of selection of each node type in accordance with an adaptability, which is representative of a degree of overlapping selection indicating whether or not the network node and the other node are selecting a same node type, and calculating a probability of selection of each node on a basis of the easiness of selection determined;
   a type selection executer for executing node type selection in accordance with the selection probability of each node calculated by said type selection probability calculator; and
   a convergence determiner for determining that the node type of the network node has converged when a particular node type selected by said type selection executer continues over a predetermined interval.

3. The apparatus in accordance with claim 1, wherein when said node type selector uses node type information for a set of nodes n hops, n being a natural number, apart from the network node, transmits a signal to a node range m hops, m being a natural number greater than n, apart from the network node.

4. The apparatus in accordance with claim 1, wherein the phase response function has a dynamic characteristic that causes a phase state of the network node to repulse a phase state of the other node,
   the synchronization alliance function having a dynamic characteristic that causes the phase state of the network node to vary in a direction of synchronization relative to the phase state of the other node,
   said transmission timing calculator causing, when the node type information of the other node is identical with the node type information selected by the network node, the dynamic characteristic of the synchronization alliance function to appear, and causing, when the node type information of the other node is different from the node type information selected by the network node, the dynamic characteristic of the phase response function to appear.

5. The apparatus in accordance with claim 1, further comprising a number-of-nodes determiner for autonomously determining, in the event of selection of a node type, a number of node types in response to an output of said node type selector.

6. The apparatus in accordance with claim 5, wherein said node type selector comprises:
   a stress value calculator for calculating, upon receiving from said node type selector an adaptability representative of a degree of overlapping selection indicating whether or not the network node and the other node are selecting a same node type, a stress value representative of a degree of non-adaptability if the adaptability does not increase over a predetermined period of time in accordance with time-serial information of the adaptability; and a node type increasing circuit for increasing the number of nodes when a cumulative stress value, which is a sum of stress values calculated by said stress value calculator, increases above a first predetermined threshold value.

7. The apparatus in accordance with claim 5, wherein said number-of-nodes determiner comprises:

a stress value calculator for calculating, upon receiving from said node type selector an adaptability representative of a degree of overlapping selection indicating whether or not the network node and the other node are selecting a same node type, a stress value representative of a non-adaptability by adding a predetermined weighting factor matching with a time to time-serial information of adaptabilities appearing within a predetermined period of time; and a node type increasing circuit for accumulating, when a predetermined period of time has elapsed from a time at which the time-serial information of adaptabilities had a maximum value, stress values calculated by said stress value calculator, and then increasing the number of node types when a resulting cumulative stress value increases above a first predetermined threshold value.

8. The apparatus in accordance with claim 6, wherein said node type determiner further comprises a node type decreasing circuit for receiving adaptabilities from said node type selector, and reducing, based on the time-serial information of the adaptabilities, a number of node types if the adaptability has a maximum value or a value greater than a second predetermined threshold value inclusive and if a current number of types is greater than an initial number of types.

9. The apparatus in accordance with claim 7, wherein said node type determiner further comprises a node type decreasing circuit for receiving adaptabilities from said node type selector, and reducing, based on the time-serial information of the adaptabilities, a number of node types if the adaptability has a maximum value or a value greater than a second predetermined threshold value inclusive and if a current number of types is greater than an initial number of types.

10. A network node constituting a telecommunications system together with another node and including a communication control apparatus, wherein said apparatus comprises:

a node type information transmitter/receiver for receiving node type information selected by a neighboring node, and transmitting node type information selected by said network node and node type information of the other node;

a state variable signal transmitter/receiver for receiving a state variable signal of the neighboring node reflecting a phase representative of a timing of data transmission from the neighboring node, and transmitting a state variable signal representative of a timing of data transmission from said network node;

a node type selector for selecting a node type of the network node in accordance with node type information of the other node received via said node type information transmitter/receiver; and a transmission timing calculator operative in response to the node type information of said network node selected by said node type selector, the node type information of the other node and the state variable signal of the neighboring node for varying a state of the phase of the network node in accordance with a time evolution rule based on a phase response function and a synchronization alliance function for thereby determining a data transmission timing of said network node, the time evolution rule changing a nonlinear oscillation rhythm of the phase of said network node in response to an impulse signal received from the neighboring node.

11. A telecommunications system comprising a network node including a communication control apparatus, wherein said apparatus comprises:

a node type information transmitter/receiver for receiving node type information selected by a neighboring node, and transmitting node type information selected by the network node and node type information of another node;

a state variable signal transmitter/receiver for receiving a state variable signal of the neighboring node reflecting a phase representative of a timing of data transmission from the neighboring node, and transmitting a state variable signal representative of a timing of data transmission from the network node;

a node type selector for selecting a node type of the network node in accordance with node type information of the other node received via said node type information transmitter/receiver; and a transmission timing calculator operative in response to the node type information of the network node selected by said node type selector, the node type information of the other node and the state variable signal of the neighboring node for varying a state of the phase of the network node in accordance with a time evolution rule based on a phase response function and a synchronization alliance function for thereby determining a data transmission timing of the network node, the time evolution rule changing a nonlinear oscillation rhythm of the phase of the network node in response to an impulse signal received from the neighboring node.

12. A communication control method applied to a network node constituting a telecommunications system, comprising the steps of:

receiving node type information selected by a neighboring node;

transmitting node type information selected by a network node and node type information of another node;

receiving a state variable signal of the neighboring node reflecting a phase representative of a timing of data transmission from the neighboring node;

transmitting a state variable signal representative of a timing of data transmission from the network node;

selecting a node type of the network node in accordance with node type information of the other node received in said step of receiving the node type information; and determining a data transmission timing of the network node by varying, based on the node type information of the network node selected in said step of selecting the node type, the node type information of the other node and the state variable signal of the neighboring node, a state of the phase of the network node in accordance with a time evolution rule based on a phase response function and a synchronization alliance function, the time evolution rule changing a nonlinear oscillation rhythm of the phase of the network node in response to an impulse signal received from the neighboring node.

13. The method in accordance with claim 12, wherein said step of selecting the node type comprises the substeps of:

determining easiness of selection of each node type in accordance with an adaptability, which is representative of a degree of overlapping selection indicating whether or not the network node and the other node are selecting a same node type, and calculating a probability of selection of each node on a basis of the easiness of selection determined;

executing node type selection in accordance with the selection probability of each node calculated by said substep of calculating the probability of selection; and determining that the node type of the network node has converged when a particular node type selected by said substep of executing the type selection continues over a predetermined interval.

14. The method in accordance with claim 12, wherein when in said step of selecting the node type node type information for a set of nodes n hops, n being a natural number, apart from the network node, is used, a signal is transmitted to a node range m hops, m being a natural number greater than n, apart from the network node.

15. The method in accordance with claim 12, wherein the phase response function has a dynamic characteristic that causes a phase state of the network node to repulse a phase state of the other node, the synchronization alliance function having a dynamic characteristic that causes the phase state of the network node to vary in a direction of synchronization relative to the phase state of the other node, said step of determining the transmission timing causing, when the node type information of the other node is identical with the node type information selected by the network node, the dynamic characteristic of the synchronization alliance function to appear, and causing, when the node type information of the other node is different from the node type information selected by the network node, the dynamic characteristic of the phase response function to appear.

16. The method in accordance with claim 12, further comprising the step of autonomously determining, in the event of selection of a node type, a number of node types in response to said step of selecting the node type.

17. The method in accordance with claim 16, wherein said step of selecting the node type comprises the substeps of:

calculating, upon receiving from said step of selecting the node type an adaptability representative of a degree of overlapping selection indicating whether or not the network node and the other node are selecting a same node type, a stress value representative of a degree of non-adaptability if the adaptability does not increase over a predetermined period of time in accordance with time-serial information of the adaptability; and increasing the number of nodes when a cumulative stress value, which is a sum of stress values calculated by said substep of calculating the stress value, increases above a first predetermined threshold value.

18. The method in accordance with claim 16, wherein said step of autonomously determining comprises the substeps of:

calculating, upon receiving from said step of selecting the node type an adaptability representative of a degree of overlapping selection indicating whether or not the network node and the other node are selecting a same node type, a stress value representative of a non-adaptability by adding a predetermined weighting factor matching with a time to time-serial information of adaptabilities appearing within a predetermined period of time; and accumulating, when a predetermined period of time has elapsed from a time at which the time-serial information of adaptabilities had a maximum value, stress values calculated by said substep of calculating the stress value, and then increasing the number of node types when a resulting cumulative stress value increases above a first predetermined threshold value.

19. The method in accordance with claim 17, wherein said step of autonomously determining further comprises the substep of receiving adaptabilities from said step of selecting the node type, and reducing, based on the time-serial information of the adaptabilities, a number of node types if the adaptability has a maximum value or a value greater than a second predetermined threshold value inclusive and if a current number of types is greater than an initial number of types.

20. The method in accordance with claim 18, wherein said step of autonomously determining further comprises the substep of receiving adaptabilities from said step of selecting the node type, and reducing, based on the time-serial information of the adaptabilities, a number of node types if the adaptability has a maximum value or a value greater than a second predetermined threshold value inclusive and if a current number of types is greater than an initial number of types.

* * * * *